(12) United States Patent
Sardes et al.

(10) Patent No.: US 11,654,987 B2
(45) Date of Patent: May 23, 2023

(54) VEHICLE CORNER MODULES AND VEHICLES COMPRISING THEM

(71) Applicant: REE AUTOMOTIVE LTD., Kibbutz Glil-Yam (IL)

(72) Inventors: Ahishay Sardes, Tel Aviv (IL); Tomer Segev, Tel Aviv (IL); Ran Dekel, Nofit (IL); Shmuel Chioclea, Tel Aviv (IL); Neta Doron, Tel Aviv (IL)

(73) Assignee: REE AUTOMOTIVE LTD, Kibbutz Glil Yam (IL)

( * ) Notice: Subject to any disclaimer, the term of this patent is extended or adjusted under 35 U.S.C. 154(b) by 0 days.

(21) Appl. No.: 17/964,948

(22) Filed: Oct. 13, 2022

(65) Prior Publication Data

US 2023/0032858 A1 Feb. 2, 2023

Related U.S. Application Data

(63) Continuation of application No. 17/666,321, filed on Feb. 7, 2022, now Pat. No. 11,479,313, and a
(Continued)

(51) Int. Cl.
*B60K 7/00* (2006.01)
*B62D 65/04* (2006.01)
(Continued)

(52) U.S. Cl.
CPC ............ *B62D 65/04* (2013.01); *B60K 7/0007* (2013.01); *B60K 23/00* (2013.01); *B60K 26/00* (2013.01);
(Continued)

(58) Field of Classification Search
CPC ...... B62D 65/04; B62D 7/0007; B62D 23/00; B62D 26/00
See application file for complete search history.

(56) References Cited

U.S. PATENT DOCUMENTS 7,441,615 B2 * 10/2008 Borroni-Bird ......... B62D 21/10
180/402
11,180,207 B2 11/2021 Sardes
(Continued)

FOREIGN PATENT DOCUMENTS

| CN | 107949514 A | 4/2018 |
|---|---|---|
| DE | 102010011307 A1 | 9/2011 |
| SE | 1850807 A1 | 12/2019 |

OTHER PUBLICATIONS

Machine translation of CN 107949514 [CN 107949514 published on Apr. 2, 2018].
(Continued)

*Primary Examiner* — Hau V Phan
(74) *Attorney, Agent, or Firm* — Momentum IP; Marc Van Dyke

(57) ABSTRACT

A vehicle corner module (VCM) is provided for regulating motion of a host vehicle which comprises a vehicle-onboard vehicle-controller. The VCM comprises a sub-frame mountable to a reference frame of the host vehicle; a wheel-hub assembly comprising a wheel-hub; VCM-sub-systems mediating between the sub-frame and the wheel-hub assembly, e.g., a drive subsystem, a steering subsystem, a suspension subsystem and/or a braking subsystem; and an VCM-onboard VCM-controller, comprising one or more processors and a computer-readable medium storing program instructions that, when executed by the one or more processors, cause the one or more processors to establish a communication link with a vehicle-controller, including electronically transferring information about the VCM from the VCM-controller to the vehicle-controller, and to perform, in response to an installation of the VCM on a vehicle, a post-installation validation-process that includes validating
(Continued)

the VCM-subsystems and communicating a result of the validating to the vehicle-controller.

19 Claims, 30 Drawing Sheets

Related U.S. Application Data continuation of application No. 17/789,216, filed as application No. PCT/IB2020/062598 on Dec. 31, 2020, said application No. 17/666,321 is a continuation of application No. 17/464,121, filed on Sep. 1, 2021, now Pat. No. 11,267,522, which is a continuation of application No. 17/335,983, filed on Jun. 1, 2021, now Pat. No. 11,180,207, said application No. 17/666,321 is a continuation of application No. PCT/IB2020/062598, filed on Dec. 31, 2020, said application No. 17/464,121 is a continuation of application No. PCT/IB2020/062598, filed on Dec. 31, 2020, said application No. 17/335,983 is a continuation of application No. PCT/IB2020/062598, filed on Dec. 31, 2020.

(60) Provisional application No. 62/956,358, filed on Jan. 2, 2020.

(51) Int. Cl.
| | |
|---|---|
| *B60K 23/00* | (2006.01) |
| *B60K 26/00* | (2006.01) |
| *B60W 10/08* | (2006.01) |
| *B60W 10/18* | (2012.01) |
| *B60W 10/20* | (2006.01) |
| *B60W 10/22* | (2006.01) |
| *B60W 50/02* | (2012.01) |
| *B60W 50/029* | (2012.01) |
| *H04L 12/40* | (2006.01) |

(52) U.S. Cl.
CPC ............ *B60W 10/08* (2013.01); *B60W 10/18* (2013.01); *B60W 10/20* (2013.01); *B60W 10/22* (2013.01); *B60W 50/0205* (2013.01); *B60W 50/029* (2013.01); *H04L 12/40* (2013.01); *B60W 2050/0292* (2013.01); *B60W 2556/10* (2020.02); *H04L 2012/40273* (2013.01)

(56) References Cited

U.S. PATENT DOCUMENTS

| | | | | |
|---|---|---|---|---|
| 11,267,522 | B2* | 3/2022 | Sardes | ................... B62D 65/04 |
| 11,465,699 | B1* | 10/2022 | Sardes | ................ B60R 16/0231 |
| 11,479,313 | B2* | 10/2022 | Sardes | ................ B60K 17/356 |
| 2002/0193910 | A1 | 12/2002 | Strege | |
| 2005/0073123 | A1 | 4/2005 | Kapaan | |
| 2007/0199748 | A1 | 8/2007 | Ross | |
| 2015/0083508 | A1* | 3/2015 | Bluethmann | ........ B62D 5/0418 |
| | | | | 180/204 |
| 2016/0129958 | A1 | 5/2016 | Byrnes | |
| 2018/0251123 | A1* | 9/2018 | Sigmar | .................... B60G 3/20 |
| 2018/0345777 | A1* | 12/2018 | Birnschein | ............ B60W 10/08 |
| 2018/0345971 | A1 | 12/2018 | Birnschein | |
| 2019/0291797 | A1* | 9/2019 | Richards | ................ B62D 65/12 |
| 2021/0284262 | A1 | 9/2021 | Sardes | |
| 2021/0394846 | A1 | 12/2021 | Sardes | |
| 2022/0161878 | A1 | 5/2022 | Sardes | |
| 2023/0032858 | A1 | 2/2023 | Sardes | |
| 2023/0037230 | A1 | 2/2023 | Sardes | |

OTHER PUBLICATIONS

Machine translation of DE 102010011307 [DE 102010011307 published on Sep. 15, 2011].
International Search Report for PCT/IB2020/062598 dated Apr. 21, 2021.
Written Opinion for PCT/IB2020/062598 dated Apr. 21, 2021.

\* cited by examiner

| | HUMAN OPERATOR | ROBOTIC SYSTEM | VEHICLE PLATFORM | VCM Other VCM | EXT. COMP |
|---|---|---|---|---|---|
| PLUGGING VCM TO VEHICLE PLATFORM | V | V | | | |
| VALIDATING VCM | | | V | | V |
| RECEIVING VCM OPERATIONAL PROFILE DATA | | | V | | |
| MATCHING VCM PROFILE WITH PLATFORM | | | V | V | |
| MATCHING VCM PROFILE WITH CORNERS PROFILE | | | V | | |
| ACTIVATING VCM TO OPERATIONAL STATE | | | V | V | |
| UPLOADING HISTORICAL VCM INFORMATION TO CCU | | | | | V |
| ADJUSTING VCM PROFILE TO CORRESPOND TO PLATFORM | | | V | V | |
| ADJUSTING VCM PROFILE TO CORRESPOND OTHER VCMs | | | V | V | |
| ADJUSTING PROFILES OF OTHER VCMS | | | | V V | |

FIG. 6

VEHICLE CORNER MODULES AND VEHICLES COMPRISING THEM

CROSS-REFERENCE TO RELATED APPLICATIONS

PCT/IB2020/062598 which was filed on Dec. 31, 2020, and which is incorporated herein by reference in its entirety. PCT/IB2020/062598 claims the benefit of U.S. Provisional Patent Application No. 62/956,358, filed on Jan. 2, 2020, which is incorporated herein by reference in its entirety. U.S. application Ser. No. 17/335,983 which was filed on Jun. 1, 2021 is incorporated herein by reference in its entirety. U.S. application Ser. No. 17/464,121 which was filed on Sep. 1, 2021 is incorporated herein by reference in its entirety. U.S. application Ser. No. 17/666,321 which was filed on Feb. 7, 2022 is incorporated herein by reference in its entirety.

FIELD OF THE INVENTION

The present invention relates to vehicle corner modules (VCMs) for regulating motion of host vehicles, and particularly to VCMs comprising onboard mechanical and electrical sub-systems of the VCMs.

BACKGROUND

Onboard vehicle systems have been developed and improved over the course of more than a century, resulting in sophisticated designs that integrate and centralize the management of the various mechanical and electrical subsystems. Available control systems are limited to managing individual functionalities and do not integrate or combine the management of multiple sub-systems.

Newly-conceived vehicle platforms designed for electric propulsion can include modular axle-less wheel assemblies ("vehicle corner modules, or VCMs) requiring independent suspension, drivetrain, braking and steering sub-systems installed at individual wheels. These designs require new mechanical and electronic solutions for executing, at each wheel, externally-generated operating instructions with regards to the local sub-systems. New control models are required for managing not only the regular operation of the integrated wheel systems but also servicing, testing and administration functions.

SUMMARY

According to embodiments of the invention, a vehicle corner module (VCM) is disclosed for regulating motion of a host vehicle, wherein the vehicle comprises a vehicle-onboard vehicle-controller, and the VCM comprises: (a) a sub-frame mountable to a reference frame of the host vehicle; (b) a wheel-hub assembly comprising a wheel-hub; (c) a plurality of sub-systems mediating between the sub-frame and the wheel-hub assembly, the plurality of subsystems selected from the group of subsystems consisting of a drive subsystem, a steering subsystem, a suspension subsystem and a braking subsystem; and (d) an VCM-onboard VCM-controller, comprising one or more processors and a computer-readable medium storing program instructions that, when executed by the one or more processors, cause the one or more processors to carry out the following steps: (i) establish a communication link with a vehicle-controller, wherein the establishing includes electronically transferring information about the VCM from the VCM-controller to the vehicle-controller, and (ii) perform, in response to an installation of the VCM on a vehicle, a post-installation validation-process that includes validating the plurality of subsystems and communicating a result of the validating to the vehicle-controller.

In some embodiments, the establishing of the communication link with the vehicle-controller can be before the installation.

In some embodiments, post-installation operation of the vehicle can be contingent upon receiving a positive validation-process result.

In some embodiments, the computer-readable medium can additionally contain program instructions that, when executed by the one or more processors, cause the one or more processors to regulate, in response to incoming electrical signals received from outside the VCM, actuation of at least one sub-system of the plurality of sub-systems.

In some embodiments, the information about the VCM transferred from the VCM-controller to the vehicle-controller can include information about at least one of the plurality of subsystems.

In some embodiments, it can be that the communication link with the vehicle-controller is a two-way link, and/or that the establishing of the communication link additionally includes receiving information about the vehicle, and/or about another VCM installed on the vehicle.

In some embodiments, the computer-readable medium can additionally contain program instructions that, when executed by the one or more processors, cause the one or more processors to exchange information with an onboard controller of another VCM installed on the vehicle.

In some embodiments, the information about the VCM can include results of a self-diagnostic test carried out before the installation.

In some embodiments, the information about the VCM can include at least one of operating history and maintenance history of the VCM.

In some embodiments, the validating of the plurality of subsystems can include receiving information from one or more sensors onboard the VCM.

In some embodiments, the computer-readable medium can additionally contain program instructions that, when executed by the one or more processors, cause the one or more processors to the determine an operating profile for the VCM based on data received from the vehicle-controller.

In some embodiments, the selected plurality of sub-systems comprises at least three sub-systems. In some embodiments, the selected plurality of sub-systems comprises four sub-systems.

In some embodiments, a vehicle can comprise: (a) one or more pairs of opposing VCMs according to any one of the VCMs described above; (b) a vehicle-controller; and/or (c) a communications bus for electronic communication between the vehicle-controller and the respective VCM-controller of each of the VCMs.

In some embodiments, a vehicle can comprise: (a) one or more pairs of opposing VCMs according to any one of the VCMs described above; (b) a vehicle-controller; and (c) a communications bus for electronic communication between the respective VCM-controllers of at least one pair of the one or more pairs of opposing VCMs. In some such embodiments, the communications bus can be additionally for electronic communication between the respective VCM-controllers of at least one pair of the one or more pairs of opposing VCMs.

In some embodiments, an apparatus for use in offline testing of a VCM when the VCM is mechanically decoupled from any vehicle, the VCM being any one of the VCMs described above, can comprise: (a) a support element for at least partly supporting the weight of the sub-frame and for constraining movement of the sub-frame; (b) at least one diagnostic device for measuring operational data of at least one of the plurality of subsystems, and/or (c) a computing device configured to communicate with the VCM-controller and receive therefrom diagnostic information related to the offline testing, wherein the offline testing can include a functional test of at least one of the plurality of subsystems.

In some embodiments, a method of operating a vehicle according to any one the vehicle embodiments disclosed above can comprise: controlling, by a VCM-controller, actuation of one or more sub-systems of the plurality of subsystems of a VCM, in response to an incoming electrical input from outside the VCM.

A method is disclosed, according to embodiments, of replacing a first vehicle corner module (VCM) with a second VCM, wherein each of the first and second VCMs comprise a sub-frame mountable to a reference frame of a vehicle, a wheel-hub assembly, a VCM-onboard VCM-controller, and a plurality of subsystems mediating between the sub-frame and the wheel-hub assembly and selected from the group of subsystems consisting of a drive subsystem, a steering subsystem, a suspension subsystem and a braking subsystem. The method comprises the following steps: (a) establishing an electronic communication link between the respective VCM-controller of the second VCM and a vehicle-onboard vehicle-controller, wherein the establishing includes transferring information about the second VCM from the respective VCM-controller to the vehicle-controller; (b) in response to and contingent upon an installation of the second VCM on the vehicle, completing a post-installation validation that includes validating the respective plurality of subsystems of the second VCM and communicating a result of the validation to the vehicle-controller; and (c) using the communicated result of the validation to enable or disable post-installation operation of the vehicle.

In some embodiments, the method can additionally comprise the step of transmitting, to a permission system in an external computer, information about the replacing of the first VCM with the second VCM. In some such embodiments, the method can additionally comprise the step of receiving, from the permission model, a permission based on a service subscription, and/or the step of receiving, from the permission model, a permission based on a transaction.

In some embodiments, the information transmitted to the permission system can include at least two of: respective identifying information of the first and second VCMs; usage information of one or more of the respective plurality of subsystems of the first VCM; and maintenance information of one or more of the respective plurality of subsystems of the first VCM.

In some embodiments, a value can be assigned to the replacing based on at least one of: usage information of one or more of the respective plurality of subsystems of the first VCM; usage information of one or more of the respective plurality of subsystems of the second VCM; maintenance information of one or more of the respective plurality of subsystems of the first VCM; and maintenance information of one or more of the respective plurality of subsystems of the second VCM.

In some embodiments, the method can additionally comprise the step of determining an operating profile for the second VCM based on information received from the vehicle-controller.

In some embodiments, the electronic communication link between the respective VCM-controller of the second VCM and the vehicle-onboard vehicle-controller can be established before the installation.

In some embodiments, it can be that the electronic communication link with the vehicle-controller is a two-way link, and/or that the establishing of the electronic communication link additionally includes receiving information about the vehicle, and/or about another VCM installed on the vehicle.

In some embodiments, at least a portion of the information about the second VCM transferred from the respective VCM-controller to the vehicle-controller can include a response to a query.

In some embodiments, the information about the second VCM includes results of a self-diagnostic test carried out before the installation.

In some embodiments, the information about the second VCM can include at least one of operating history and maintenance history of the second VCM.

In some embodiments, the validating of the plurality of subsystems can include receiving information from one or more sensors onboard the second VCM.

According to embodiments of the invention, a vehicle-mountable vehicle corner module (VCM) for regulating motion of a host vehicle comprises: (a) a plurality of mechanical subsystems residing entirely on board the VCM to mediate between the sub-frame and the wheel-hub assembly, the subsystems selected from the group of subsystems consisting of a drive subsystem, a steering subsystem, a suspension subsystem and a braking subsystem; and (b) an VCM-onboard VCM-controller for actuating, in response to incoming electrical signals received from outside the VCM, the plurality of mechanical sub-systems, the VCM-controller comprising a communications module configured to establish a communication link with a vehicle-onboard vehicle-controller for exchanging information therebetween after the VCM is mounted to the host vehicle.

In some embodiments, the communications module can be additionally configured to establish a communication link with the vehicle-onboard vehicle-controller for exchanging information therebetween before the VCM is mounted to the host vehicle.

In some embodiments, the information can include results of validating the plurality of sub-systems by the VCM-controller.

In some embodiments, operation of the vehicle after the VCM is mounted thereto can be contingent upon receiving a positive validation-process result from the VCM-controller.

A method is disclosed, according to embodiments, for replacing a first vehicle corner module (VCM) of a host vehicle with a second VCM, each of the first and second VCMs comprising (i) plurality of mechanical subsystems residing entirely on board the VCM to mediate between the sub-frame and the wheel-hub assembly, the subsystems selected from the group of subsystems consisting of a drive subsystem, a steering subsystem, a suspension subsystem and a braking subsystem, and (ii) a VCM-onboard VCM-controller for actuating, in response to incoming electrical signals received from outside the VCM, the plurality of mechanical sub-systems, the method comprising: (a) establishing an electronic communication link between the respective VCM-controller of the second VCM and a vehicle-controller onboard the host vehicle; and (b) transferring information about the second VCM from the respective VCM-controller to the vehicle-controller.

In some embodiments, the communication link can be established before the VCM is mounted to the host vehicle.

In some embodiments, the transferred information can include results of validating the plurality of sub-systems by the VCM-controller.

In some embodiments, operation of the vehicle after the VCM is mounted thereto can be contingent upon receiving a positive validation-process result from the VCM-controller.

According to embodiments of the invention, apparatus is disclosed for use in offline testing of a vehicle control module (VCM) when the VCM is mechanically decoupled from any vehicle, the VCM comprising a sub-frame mountable to a reference frame of a vehicle, a wheel-hub assembly, a VCM-onboard VCM-controller, and plurality of subsystems residing onboard the VCM to mediate between the sub-frame and the wheel-hub assembly, the subsystems selected from the group of subsystems consisting of a drive subsystem, a steering subsystem, a suspension subsystem and a braking subsystem. The apparatus comprises: (a) a support element for at least partly supporting the weight of the sub-frame and for constraining movement of the sub-frame; (b) at least one diagnostic device for measuring operational data of at least one of the plurality of subsystems, and (c) a computing device configured to communicate with the VCM-controller and receive therefrom diagnostic information related to the offline testing, wherein the testing includes a functional test of at least one of the plurality of subsystems.

In some embodiments, the computing device can be additionally configured (i) to receive diagnostic information related to the testing from the at least one diagnostic device and/or (ii) combine diagnostic information received from the at least one diagnostic device with diagnostic information received from the VCM-controller.

In some embodiments, at least one parameter of the testing can be selected by the VCM-controller.

In some embodiments, the at least one diagnostic device can include a chassis dynamometer.

According to embodiments of the invention, a vehicle comprises: (a) a vehicle-onboard vehicle-controller; (b) one or more pairs of opposing vehicle corner modules (VCMs), each VCM comprising a sub-frame mounted to a reference frame of the vehicle, a wheel-hub assembly, a VCM-onboard VCM-controller, a plurality of subsystems mediating between the sub-frame and the wheel-hub assembly and selected from the group of subsystems consisting of a drive subsystem, a steering subsystem, a suspension subsystem and a braking subsystem; and (c) communications arrangements enabling peer-to-peer data communications between respective VCM-controllers of at least one pair of the one or more pairs of opposing VCMs, the respective VCM-controllers being configured to exchange information therebetween.

In some embodiments, the exchanged information can include at least one of operating history and an operating profile of a new or replaced VCM.

In some embodiments, the VCM-controllers can be configured to reduce, singly or in combination, a computing load on the vehicle controller.

In some embodiments, the VCM-controllers can be configured to provide an operational backup functionality, singly or in combination, for another VCM-controller.

In some embodiments, the VCM-controllers can be configured to provide an operational backup functionality, singly or in combination, for the vehicle controller.

In some embodiments, the communications arrangements can enable peer-to-peer data communications between respective VCM-controllers of all of the VCMs of the vehicle.

In some embodiments, the respective selected plurality of sub-systems in each VCM of a first pair of opposing VCMs can be not the same as the respective selected plurality of sub-systems in each VCM of a second pair of opposing VCMs.

In some embodiments, the respective selected plurality of sub-systems in each VCM of a given pair of opposing VCMs can comprise at least three sub-systems. In some embodiments, the respective selected plurality of sub-systems in each VCM of a given pair of opposing VCMs can comprise four sub-systems.

In some embodiments, the vehicle can comprise exactly four VCMs. In some embodiments, the vehicle can comprise exactly two VCMs.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 6 is a chart detailing which elements of a system that comprises one or more VCMs, are involved in the performance of each of certain operations that may take place during operation and maintenance of a vehicle having VCMs, according to embodiments of the invention;

Figure 1A:
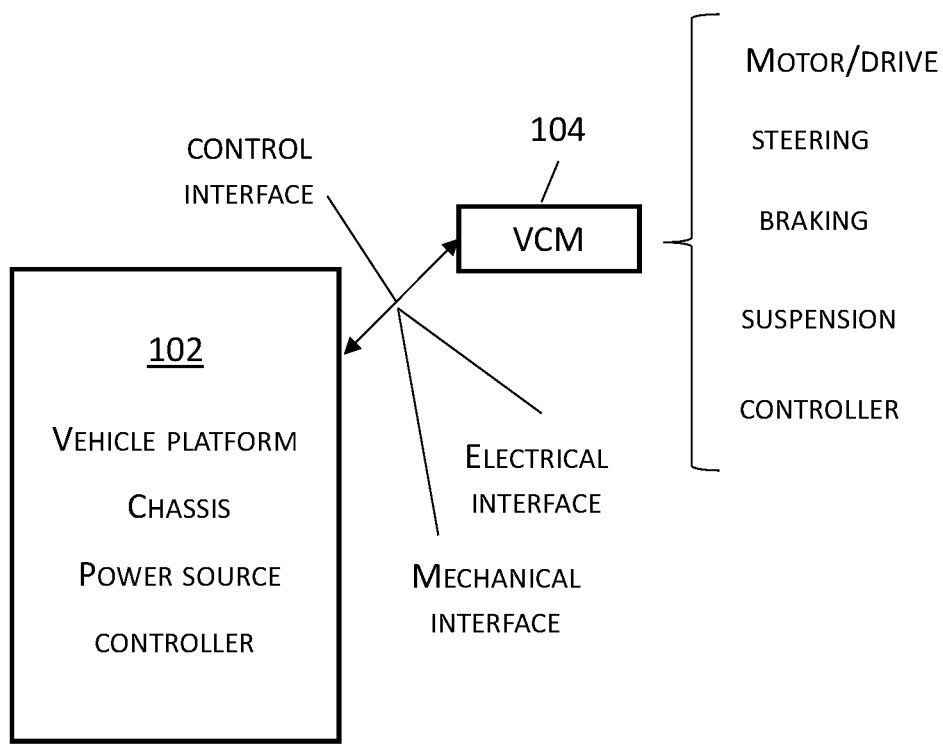
FIGS. 1A-1D depict schematic illustrations of various communication schemes between parties associated with a vehicle equipped with a vehicle corner module (VCM), according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous elements.

DETAILED DESCRIPTION OF THE PRESENT INVENTION

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Note: Throughout this disclosure, subscripted reference numbers (e.g., $10_1$ or $10_A$) may be used to designate multiple separate appearances of elements of a single species, whether in a drawing or not; for example: $10_1$ is a single appearance (out of a plurality of appearances) of element 10. The same elements can alternatively be referred to without subscript (e.g., 10 and not $10_1$) when not referring to a specific one of the multiple separate appearances, i.e., to the species in general.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Unless otherwise indicated, a "vehicle corner module" or "VCM" as used herein means an assembly for supporting a wheel of a vehicle and regulating the motion of a vehicle according to any of the embodiments disclosed herein. The VCM assembly includes components such as (and not exhaustively): steering systems, suspension systems, braking systems including hydraulic sub-systems, gearing assemblies, drive motors, driveshafts, wheel hub assemblies, controllers, communications arrangements, and electrical wiring. In some embodiments, a VCM can include a wheel and tire. A VCM can be mounted to a 'reference frame' of a vehicle, e.g., a chassis or similar vehicle frame or a platform, although the mounting need not necessarily be done 'as a unit'. When a VCM is described as being installed in/on a vehicle, then the VCM is mounted to the reference frame. A VCM may include a 'sub-frame' to which some or all of the VCM components are mounted or otherwise attached such that the sub-frame mediates between the reference frame and the various VCM components. The term 'sub-frame' should be understood to mean any rigid frame or one or more structural elements in fixed combination. The 'sub' prefix is intended to distinguish the sub-frame from a main frame or reference frame of the vehicle. A VCM may or may not include one or more electric motors and/or the wheel itself (and tire).

When used in this specification and in the claims appended hereto, the word "vehicle" is to be understood as referring to a motorized vehicle having one or more wheels. Non-limiting examples of a vehicle, according to this definition, are a vehicle with motive power provided by an onboard engine, and an 'electric vehicle' powered, when in motion, by one or more electric motors and a battery or other energy storage device onboard. The battery need not be provided with the vehicle, or installed in the vehicle, unless and until the vehicle is in motion. The word 'vehicle' should also be understood as encompassing a "vehicle platform" comprising at least a chassis (or other 'reference frame' to which VCMs can be mounted) and one or more wheels. A 'vehicle platform' need not necessarily comprise, at the time of providing the vehicle platform, all of the accoutrements required for transport of passengers and/or cargo such as vehicle-body components or interior furnishings.

The terms "communications arrangements" or similar terms such as "communications schemes" as used herein mean any wired connection or wireless connection via which data communications can take place. Non-limiting and non-exhaustive examples of suitable technologies for providing communications arrangements include any short-range point-to-point communication system such as IrDA, RFID (Radio Frequency Identification), TransferJet, Wireless USB, DSRC (Dedicated Short Range Communications), or Near Field Communication; wireless networks (including sensor networks) such as: ZigBee, EnOcean; Wi-fi, Bluetooth, TransferJet, or Ultra-wideband; and wired communications bus technologies such as. CAN bus (Controller Area Network, Fieldbus, FireWire, HyperTransport and InfiniBand. "Establishing a communications link" as used herein means initiating and/or maintaining data communications between two or more processing units (e.g., controllers, computers, processors, etc.) in accordance with any of the communications protocols supported by the two or more communicating nodes.

As used throughout this disclosure and the claims appended hereto, the term "electrical signals" or similar terms such as "electrical inputs" means electrical and/or electronic, and includes any transmission of either direct or alternating electric current, of electronic information, or of any combination of electrical and electronic signals and information.

The term "controller" as used herein means a computing device configured for monitoring, controlling, regulating and/or actuating one or more components, systems or sub-systems. A controller should be understood to include any or all of (and not exhaustively): one or more processors, one or more computer-readable media, e.g., transient and/or non-transient storage media, communications arrangements, a power source and/or a connection to a power source, and firmware and/or software. When used herein in a hyphenated expression such as vehicle-controller or VCM-controller, the term means a controller for controlling the vehicle and/or components and/or sub-systems of the vehicle, or a controller for controlling the VCM and/or components and/or sub-systems of the VCM, respectively. Unless specifically noted otherwise, a controller is installed in or on the controlled element (vehicle, VCM, etc.) while a "control unit" is like a controller but is not installed in or on the controlled element. For example, a VCM-controller is located in or on the VCM, while a VCM control unit is not, and may be located elsewhere on the vehicle, e.g., on the chassis unit. Controllers (and control units) can be programmed in advance, e.g., by having program instructions stored in the computer-readable media for execution by one of more processors of the controller. Thus, a controller 'configured' to perform a function is equivalent herein to the controller being programmed, i.e., having access to stored program instructions for execution, to perform said function.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A vehicle corner module (VCM) system is disclosed comprising a sub-frame for interfacing between the VCM and a vehicle platform, a wheel interface for coupling a wheel to the VCM, one or more VCM modules, which include mechanical assemblies and electrical units for operating a wheel when assembled on the vehicle and one or more electrical interfaces for exchanging signals and data between the VCM modules and the vehicle platform.

In some embodiments the VCM further comprises one or more sensors for measuring operational data of the one or more VCM modules and a VCM controller in electrical connection with the one or more electrical interfaces and the one or more electrical units of the VCM modules.

In some embodiments the VCM further comprises one or more of: a suspension module, a wheel driving module, a steering module, and a control module and the wheel driving module comprises one or more of: an electric motor unit, a transmission unit, and a braking unit.

In some embodiments one or more of the VCM modules are located between the wheel interface and the sub-frame.

In some embodiments the one or more of the electrical units comprise a VCM module controller and the VCM module controller comprises integrated circuits having hardware and software that control two or more VCM modules.

A vehicle is disclosed having one or more of the vehicle corner module described above.

In some embodiments the vehicle comprising a VCMs control unit (CSCU); and a platform-VCM bus for communication between the vehicle and one or more of electrical circuits located in the VCMs, In some embodiments of the vehicle the VCMs are in direct electrical communication, such that data can be exchanged between the VCMs bypassing the CSCU.

A method of activating a vehicle corner module (VCM) is disclosed comprising mounting the VCM on a vehicle platform, setting a VCM operational profile, and activating the VCM to be operational with the VCM operational profile.

In some embodiments the method further comprises matching between operational profiles of the VCM and the vehicle platform and setting of a VCM operational profile is to a matching operational profile of the VCM.

In some embodiments the method further comprises matching between operational profiles of the VCM and the operational profiles of other VCMs coupled to the vehicle platform and setting the operational profile of one or more of the VCMs coupled to the vehicle platform in accordance to the matching between operational profiles of the one or more of the VCMs.

In some embodiments the method further comprises receiving an operational plan defined for the VCM and setting VCM operational profile according to the operational plan.

A method of servicing a vehicle having one or more vehicle corner modules (VCMs) is disclosed comprising receiving an indication that servicing of a system located m the VCM is required, halting the operation of the vehicle, de-coupling the VCM from the vehicle, mounting a substituting VCM to the vehicle and resuming the operation of the vehicle.

A vehicle corner module (VCM) is disclosed in accordance with embodiments of the present invention. A VCM may be adapted to connect a vehicle's wheel to a vehicle's platform, for providing to the wheel one or more from the following capabilities: rotational power, braking, steering, and suspension.

A VCM may operate driving systems of a vehicle by communicating operational data related to driving systems located at the VCM between the VCM and the vehicle platform. The VCM may include a sub-frame for connecting the VCM to the vehicle platform. A wheel interface for mounting a vehicle wheel to the VCM, mechanical and electrical driving systems for driving the vehicle platform, sensors for measuring operational data of the VCM and for reflecting that operational data to the VCM controller and optionally to the vehicle controller and transmit/receive unit to enable exchange of the data with the vehicle controller.

Control of the driving system of a VCM may be carried out by a control unit connected to one or more of the driving systems. The control unit can be associated with each of the systems. In some embodiments, control units of two or more of the VCM systems may be embodied in a common control unit, which may be associated with multiple driving systems. Thus, a single controller can be associated with multiple VCMs thereby integrating units as opposed to distributed units)

The VCM may comprise one or more modules from a list comprising a suspension module, a wheel driving module, a steering module and a control module. A driving module may comprise one or more units from an electric motor unit, transmission unit and braking unit. A steering unit may comprise local steering actuator or mechanical steering connectors adapted to receive steering control from outside of the VCM, and optionally steering transmission unit. A control module may be adapted to control all operational aspects of the VCM, such as wheel powering parameters (moment, speed, direction etc.), suspension dampening dynamics, braking operation, steering operation, and the like.

According to embodiments of the present invention a VCM may be adapted to interface with a vehicle mechanically and electrically and to interface with control signals of the vehicle. For example, the VCM may be adapted to be connected to the vehicle's platform and optionally to mechanically interface with steering controls provided by modules on the vehicle's platform. According to some embodiments the VCM may further be coupled mechanically with rotational power provided by modules on the vehicle's platform.

In some embodiments the VCM may be adapted to receive electrical power provided by electrical modules on the vehicle's platform and to translate the electrical power to rotational power provided to a wheel by, for example, an electrical motor comprised in the VCM. The provided electrical power may farther be utilized to produce steering control to the VCM, for example using an electrical steering module such as an electrical motor, with or without steering transmission, an electrical linear motor, and the like, In some embodiments the VCM may be adapted to engage with a vehicle's control module disposed on the vehicle's platform, for exchanging data and control commands, for controlling the wheel "s rotation, braking, steering and/or suspension. In some embodiments a VCM may be configurable so as to match connecting to a given type of vehicle merely by data interaction between the vehicle controller and the VCM controller, at least with respect to control of momentary required driving power, braking profile, dampening profile and the like. According to some embodiments the plugging of a VCM to a vehicle, or its unplugging from the vehicle may be communicated to an external control unit.

A VCM module may be coupled to a vehicle's platform by mechanical means, electrical power means and control means. The coupling may be configured to operate by plug-in/plug-out means, in order to enable quick yet accurate installing/removing a VCM unit. Mounting of a VCM unit to a vehicle causes one or more of the results: coupling a wheel transmission to the vehicle platform; coupling a braking system to the vehicle's platform, coupling a suspension system to the vehicle's platform, coupling a steering system to the vehicle's platform; and coupling a wheel motor to the vehicle's platform.

According to embodiments of the invention mounting of a VCM onto a vehicle platform yields placing the vehicle and the VCM in a mechanical and electrical operational state, including required tunings and adaptations, such as adapting the dynamics of the just installed VCM (momentary driving moment, aligned steering, coordinated suspension, and the like) to the vehicle's other VCMs and vehicle platform. In some embodiments the VCM own performance parameters may be transmitted to the vehicle platform in order to enable bringing the installed VCM to full coordination with the vehicle other systems.

During installation of a VCM to a vehicle, the VCM may perform a, handshake process with a controller of the vehicle platform. In some embodiments, the handshake process includes data exchange with other VCMs of the vehicle. In some embodiments, the handshake may include communication with an external computing unit located away of the vehicle (e.g. external computer, connection to remote computing runt via cloud service, etc.).

Once installation is completed, a control system of the vehicle platform is in communication with the connected corner module and can communicate data and/or power to and from the corner modules to operate the corners by systems such as steer-by-wire, torque vectoring, brake-by-wire, yaw stability control systems (such as ESP systems), Data exchanged between computing units on the vehicle platform and a VCM can include data representative of health monitoring and associated with preventative maintenance.

Data exchanged between computing units on the vehicle platform and a VCM can include VCM module identity number (ID) to uniquely identify the VCM, VCM model, VCM systems, and VCM capabilities/specifications. The exchanged data may further comprise vital sensor readings (errors, current lifetime status of components such as bearings, seals, oil levels, brake pads, air pressure, etc.).

An aspect of the invention relates to calibration of a VCM. Calibration can be performed after mounting the VCM on the vehicle platform. Calibration can be performed as a scheduled process. Calibration may further be performed in accordance to updated operational parameters of the vehicle and/or the VCM and/or VCMs. Calibration may include measuring, diagnosing and updating one or more of the following parameters of the VCM orientation of wheel mounted on the VCM (caber, caster, toe angle), braking performance in response to a given breaking input value, and vibrations of one or more of the assemblies of the VCM.

According to embodiments of the invention operation of a VCM may be performed adaptively based on VCM lifecycle, on data received from the VCM and based on operator's settings.

In some embodiments the actuators included in a VCM may be electrical and/or hydraulic actuators. One or more electrical motors powering the driving systems in the wheel may be located at a VCM. Power source can be located in the VCM or outside the VCM. When a hydraulic power source is located outside the VCM, the VCM may include hydraulic control/power actuators/transmission to operate the driving systems and/or the steering systems. When a hydraulic power source is located inside the VCM located inside the wheel, driving transmission may be smaller or not required at all.

In some embodiments, computing load associated with a vehicle having installed thereon at least one VCM may be separated between computing units of the vehicle platform and computing units included in the VCM unit (when the VCM is installed with computing unit(s)), as the case may be, so as to ensure that the aggregated computing capability is sufficient. A minimal computing duty for a computing unit in the VCM may be collecting and pre-processing sensor data from the various sensors in the VCM and providing the pre-processed data to computing unit of the vehicle platform and further receiving flow of control signals provided by the computing unit of the vehicle platform and distributing the signals to various actuators.

In some embodiments, following the connection (or assembly of) a VCM to the vehicle platform, a data connection may be established between the parties and autonomously the newly installed VCM may be recognized and may be placed in an operational state, without the need of a human involvement. Embodiments involving relatively high computing power at the VCM side enable high capability of upgrading the VCM operational features without overloading the vehicle platform computing unit. In some embodiments the operational profile of the vehicle nay be administered by the computing unit of the VCM. Further, high computing capabilities of the computing unit of the VCM enables production of VCMs without affecting production of the vehicle platform.

In some embodiments a VCM may be in active communication not only with the vehicle platform but also with at least one other VCM. Such state is referred to as interconnected VCMs. VCM of a vehicle may be all of the same type, or may differ having same type at the front and having another type at the rear of the vehicle. In some other embodiments VCMs of one side may be of the same type and VCMs of the other side may be of a different type. For example, in a specific type of vehicle the front VCMs may be steerable and motorized while the rear VCMs may lack steering and motorizing capabilities. In another example, the VCMs may differ from each other by the sensors they are equipped with. In such embodiments VCMs that have more sensors may communicate relevant data to VCMs lacking these sensors.

In some embodiments the vehicle may be fully controlled through all aspects of the vehicle operation where all computing work is carried out by one or more of the computing units of the VCMs, with no computing unit on the vehicle platform, in some embodiments the vehicle may be controlled remotely, fully or partially, e.g. air autonomous vehicle.

A VCM—based vehicle may reduce routine or breakdown servicing time and costs by replacing traditional maintenance routine involving maintenance by the sub-module (brakes, steering, etc.) with replacement of the VCM in which one (or more) functions are misfunctioning with a fully functional VCM drat may be selected to fit the type of vehicle mechanically while all other aspects of its operation may be tuned to fit the vehicle using data exchange between the newly installed VCM and the entire vehicle and their VCMs. Tins process may take from a few seconds to up to few minutes, thereby keeping the in-garage down time of the vehicle to minimum, while the misfunctioning VCM may be maintained after the vehicle leaves the garage. The simplicity associated with the dismantling or assembling a VCM from/to a vehicle platform enables use of robotic equipment for carrying out the job, thereby expediting the process even more and reducing the man-labor hours. According to this embodiment maintenance may require less training and proficiency and even may be carried out by the operator of the vehicle at his/her own home garage. Further, a vehicle may be upgraded by upgrading its VCMs, without needing to change the vehicle platform. In addition, insurance of the vehicle may be changed from whole-vehicle model to VCM-based model of insurance.

In this type of embodiments, replacement of a VCM may involve the following steps: unfastening the VCM from the vehicle platform, disconnecting the electrical/communication connection(s) if any, positioning the replacement VCM and fastening it to the vehicle platform, re-connecting the electrical/communication connection(s) and allowing the newly installed VCM to autonomously complete its fitting-in process, carried by connecting to other VCMs and/or to the vehicle platform computing unit. This replacement process may be carried out by any one of a servicing professional, an untrained operator, or a robotic system.

VCMs that are stored on shelves waiting to be used in a vehicle may be tested for proper operational state periodically or by demand. The in-store VCM may be connected to a testing facility that many imitate full connection of the tested VCM to an operative vehicle and may inject test signals to the tested VCM and monitor the received signals, received wither from in-VCM sensors or external sensors being part of the testing facility. The test procedure may end with go/no-go of the tested VCM or may also add test brief that may be provided to the operator and also be saved in the computing unit of the tested VCM, thereby making the tuning of the VCM after it was installed on the vehicle faster and more accurate.

The testing procedure may be adapted to perform one or more of the following test protocols: testing a single system of the VCM, testing multiple systems of the VCM, testing two or more of foe VCM systems in an operational scenario involving combined operations of the systems (e.g. steering while changing speed), repetition of the test for a number of times and/or in a changing rate, and testing the VCM according to given driving profile.

Cost of usage of a VCM may serve for business transactions such as rental of vehicle, rental of corner modules, service plans, subscription services. Some examples of operational parameters are: distance traveled, hours used, accelerations (max, frequency)—data that can correlate with VCM wear rates. Operational data may be compared to operational planned values. Planned values may be part of a business plan defined for foe VCM and/or vehicle, e.g. during purchasing the VCM, renting the VCM, purchasing/subscribing to service plan for the VCM Financial data may relate to information used in insurance plan. Insurance plan can be of a corner module and/or vehicle. Insurance plan cost may be based on historical data of the VCM. According to some embodiments, operation of the VCM may be controlled according to financial data. In some embodiments, performance (operational profile) of the VCM is selected as a dependency of selected plan. In some embodiments, performance (operational profile) of the VCM is selected as a dependency of actual VCM data with respect to preceding plan. Operational profile may be set to be reduced/increased.

Some embodiments of a VCM, VCM uses, VCM as part of a vehicle and the like are described herein below with regard to the following drawings.

Figure 1B:
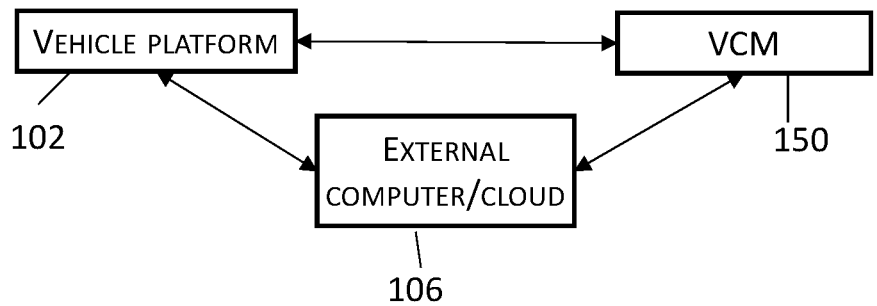

Reference is made now to FIGS. 1A-1D, that depict schematic illustrations of various communication schemes between parties associated with a vehicle equipped with VCM, according to embodiments of the invention. FIG. 1A depicts a basic communication scheme between a VCM 150 and a vehicle platform 102, which enable exchanging power and signals associated with the operation of the VCM motor, steering, braking, suspension and VCM computing unit. Signals may comprise control signals and data signals. FIG. 1B depicts a basic communication scheme between a VCM 150, a vehicle platform 102 and an external computing unit 106. Signals and power that may be exchanged between hie vehicle platform 102 and the VCM 150 may be the same as described above with respect to FIG. 1A. Additionally VCM 150 and vehicle platform 102 may exchange data with external computing unit 106, for example for storing data for later use, or for receiving stored data, or for enjoying added computing power.

Figure 1C:
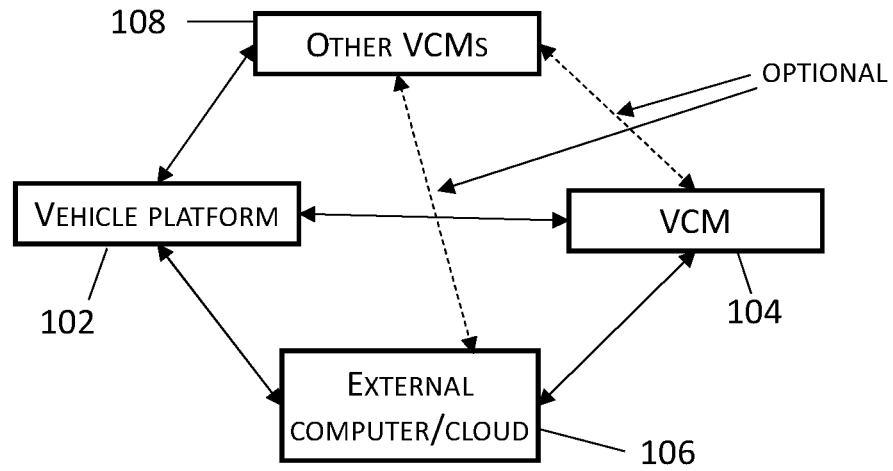

FIG. 1C depicts a basic communication scheme between a VCM 150, a vehicle platform 102, an external computing unit 106 and one or more additional VCMs 108. Signals and power that may be exchanged between the vehicle platform 102, VCM 150 and external computing unit 106 may be the same as described above with respect to FIG. 1B. Additionally, one or more other VCMs 108 that are in active communication with vehicle platform 102, as is VCM 102, may optionally be in communication with VCM 102 (i.e. inter-VCM communication) and/or with external computing unit 106.

Figure 1D:
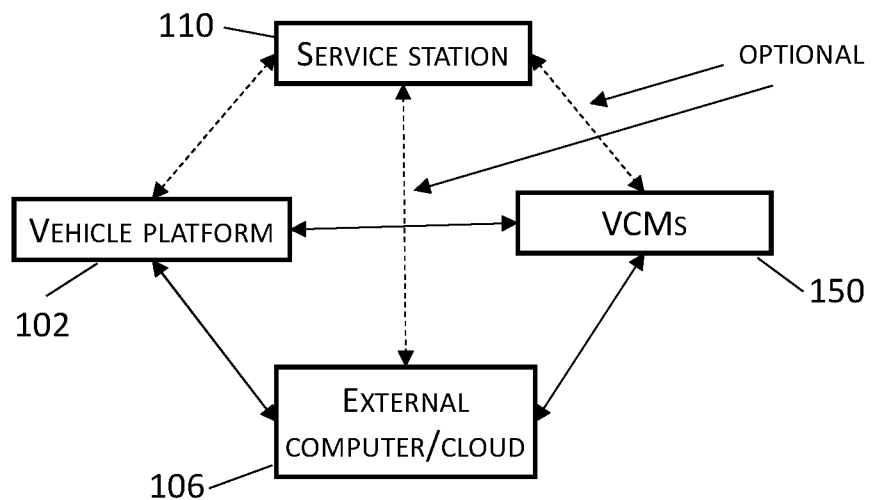

FIG. 1D depicts a basic communication scheme between a VCM 150, a vehicle platform 102, an external computing unit 106 and service station 110. Signals and power that may be exchanged between the vehicle platform 102 and VCMs 150 may be the same as described above with respect to FIG. 1A. Additionally, a service station may establish active communication with either one of vehicle platform 102, VCMs 150 and/or external computing unit 106. Signals exchanged between the service station 110 and either one of vehicle platform 102, VCMs 150 and external computing unit 106 may comprise VCM related data, vehicle related data and other type of data associated with the vehicle platform, and the VCMs. Such data may be useful for servicing a malfunctioning VCM, for updating health record of a serviced VCM, for efficient tuning a VCM to a specific vehicle and the like.

Figure 2A:
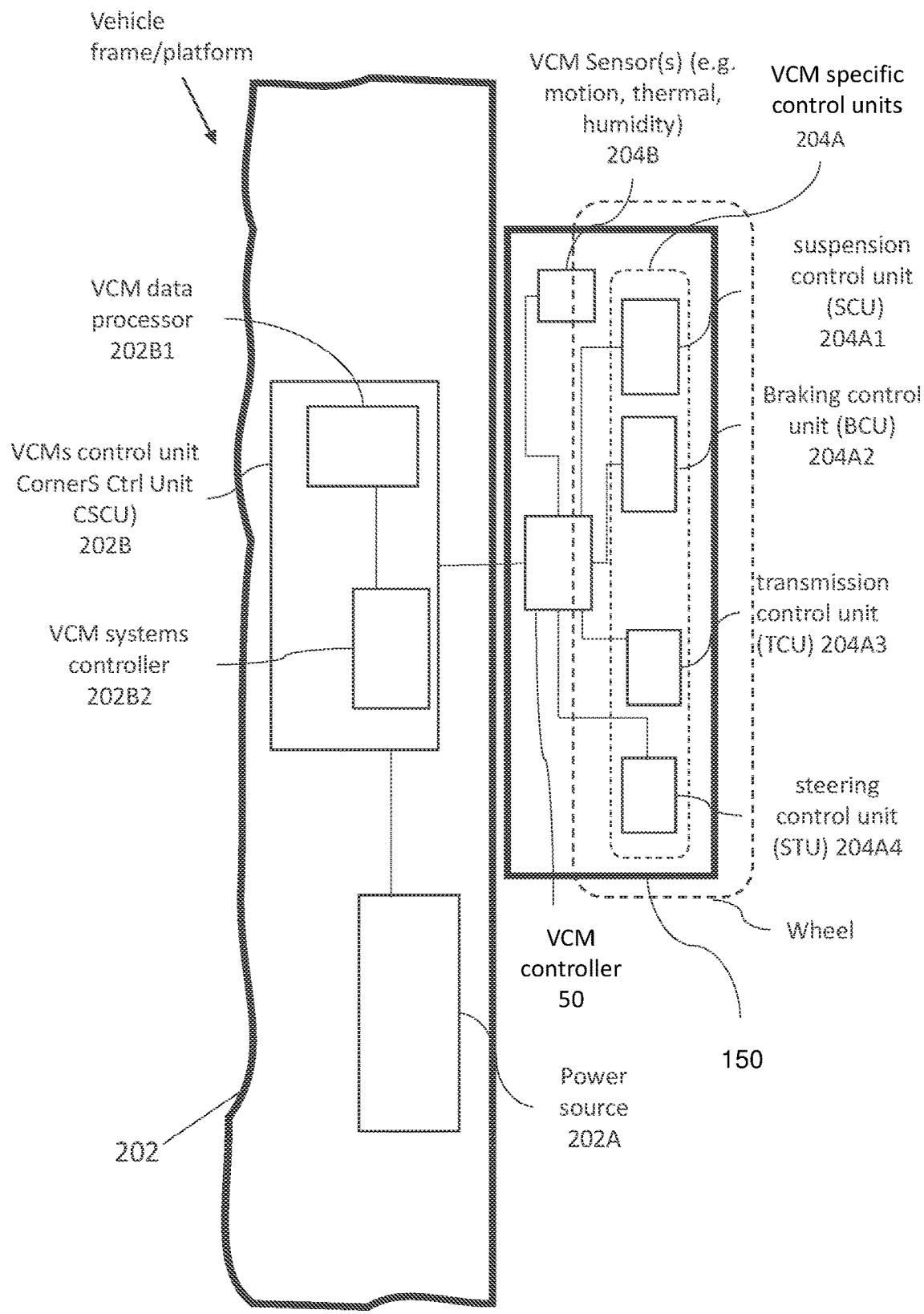
FIGS. 2A-2C depict various embodiments of communication between a vehicle platform and one or more VCMs, according to embodiments of the present invention.
Figure 2B:
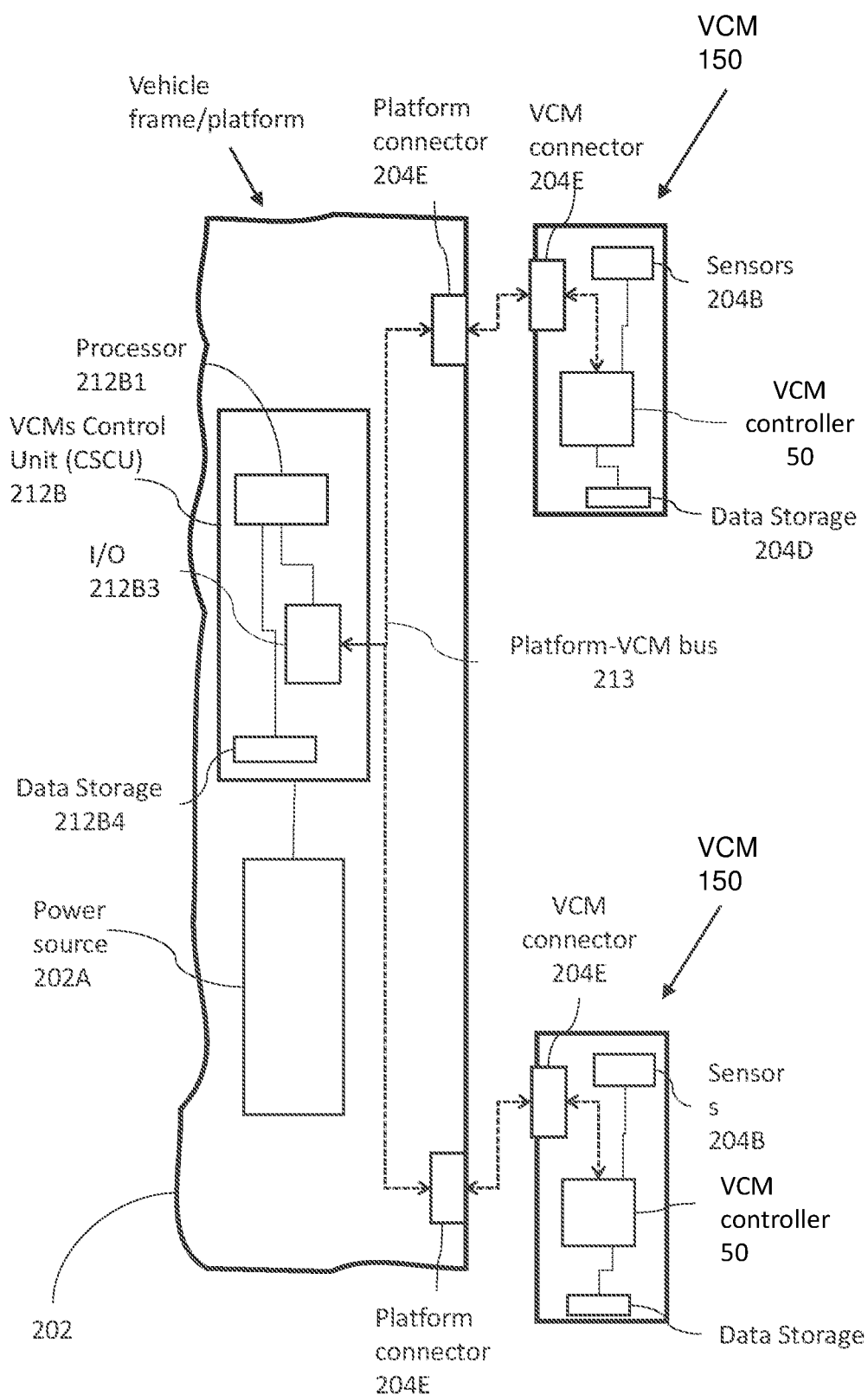
Figure 2C:
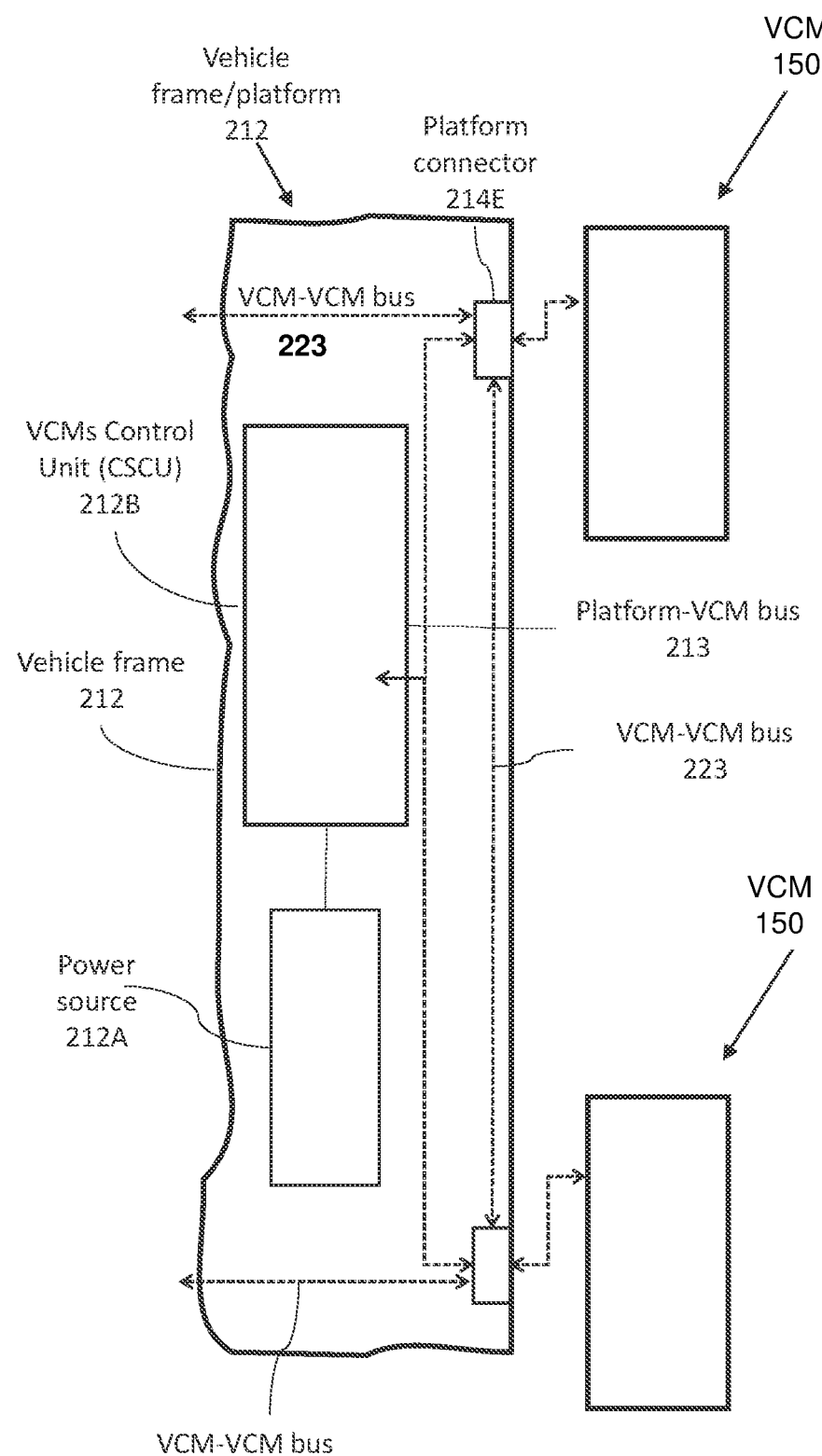

FIGS. 2A-2C depict various embodiments of communication between a vehicle platform and one or more VCMs, according to embodiments of the present invention.

Reference is made to FIG. 2A, which depicts a schematic electrical diagram of connections between units on the vehicle platform 202 and a VCM 150. A power source 202A may be located on the vehicle platform, adapted to provide power to consumers on the platform 202 and/or in the VCM 150. A VCMs control unit (CSCU) 202B may be located on the platform 202 and may comprise a VCMs data processor 202B1 and a VCMs system controller 202B2. VCM 150 may comprise one or more control units from the group 204A that may comprise a suspension control unit (SCU) 202A1, a braking control unit (BCU) 202A2, a transmission control unit (TCU) 202A3 and a steering control unit (STU) 204A4. VCM 150 may further comprise a VCM controller 50 that is adapted to communicate with all other VCM sub-system control units and with VCM sensors 204B. VCM controller 50 may be in active communication with VCM systems control unit 202B. This scheme enables flow of control and data between the vehicle platform 202 and a VCM 150.

According to some embodiments, one or more of the control units 204A are designed to have merged components and functionality. In some embodiments, merging control units is by sharing processing algorithms having shared operational parameters (e.g. rotational speed). In some embodiments, merged control units share power source. In some embodiments, merged control units receive input from a common set of sensors (e.g. sensors included in 204B). In some embodiments, merged control units are accommodated within a common mechanical compartment. In some embodiments, merging control units reduces the size of control units located within VCM 150.

According to some embodiments, one or more of control units 204A are positioned with VCM 150 by using potting technique, such as the control unit does not require external housing besides of being supported at the mechanical structure of system on VCM 150.

Reference is made to FIG. 2B, which depicts a schematic electrical diagram of connections between units on the vehicle platform 202 and more than one VCM 150, On the vehicle platform 202 power source 202A may be identical or similar to that of FIG. 2A. VCMs control unit (CSCU) 212B may comprise, additional to processor 212B1, that may be identical to processor 202B1 of FIG. 2A, also I/O unit 212B3 and data storage 212B4. I/O unit 202B3 may be adapted to communicate over a platform-VCM bus 213. Each of VCM units 150 may comprise, in addition, controller (CCU) 50 and sensors unit 204B—both may function similarly to controller 50 and sensors unit 204B of FIG. 2A. additionally, VCM 150 may comprise data storage 204D. This scheme enables flow of control and data between the vehicle platform 202 and a two or more VCMs 150 and further enables flow of control and data between VCMs directly. According to some embodiments, two or more of the control units in each VCM 150 may be embodied in a single computing unit.

Reference is made to FIG. 2C, which depicts a schematic electrical diagram of connections between units on the vehicle platform 202 and more than one VCM 150 using separated communication buses 213 and 223. The control units on vehicle platform 202 may be identical to the corresponding units of FIG. 2B. the control units in each VCM 150 may be identical to the respective control units of VCM 150 of FIG. 2B. In contrast to the communication scheme of FIG. 2B, here another communication bus is in use—VCM-VCM bus 223 that enables direct communication between two or more VCMs with no involvement of CSCU 212B of the platform. Each of the VCMs may be connected to the platform-VCM bus 213 and to the VCM-VCM bus 223 via connector 214E. This scheme enables flow of control and data between the vehicle platform 202 and a two or more VCMs 150 and further enables flow of control and data between VCMs 150 directly.

Figure 2D:
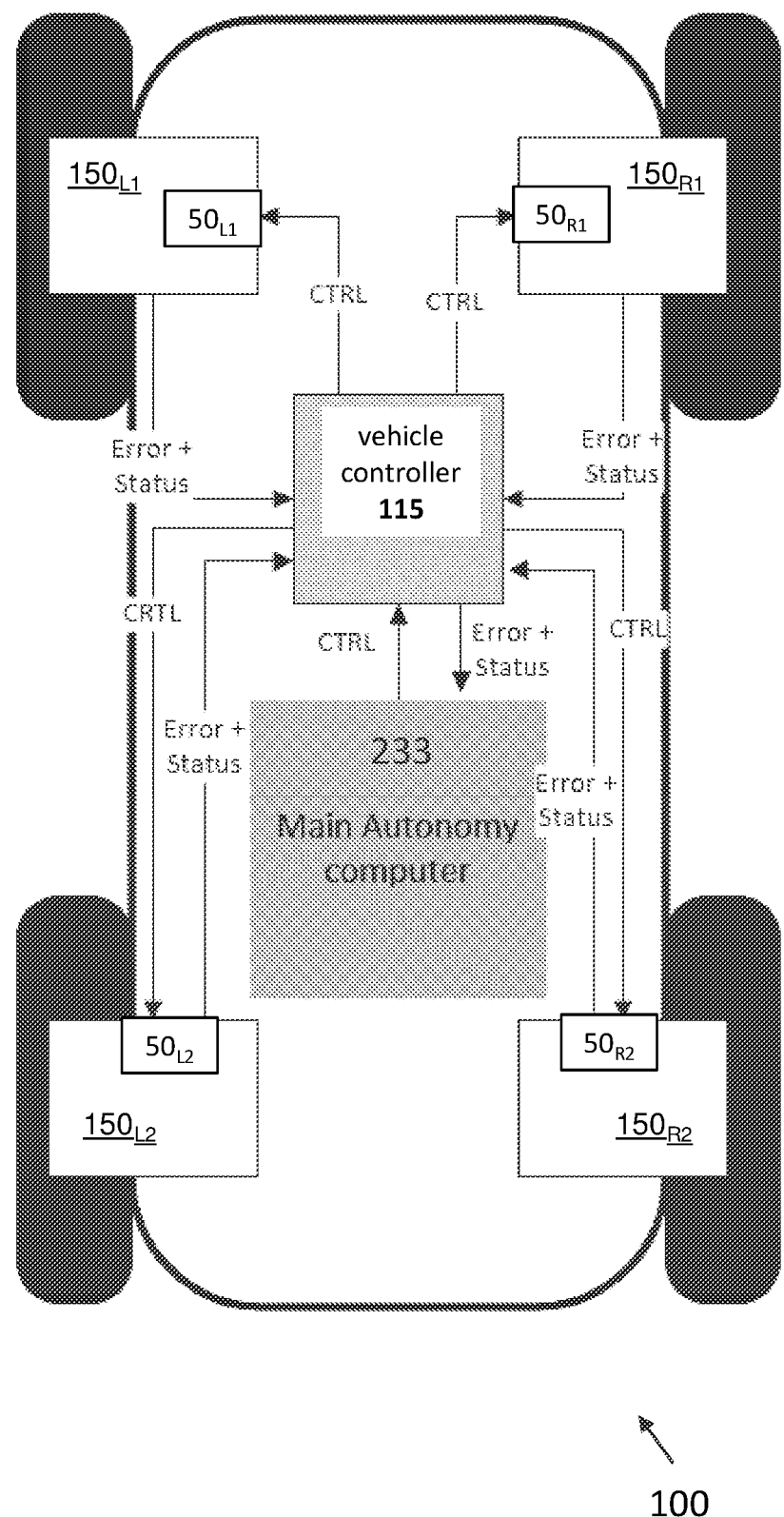
FIG. 2D is a schematic block diagram illustration presenting high-level topology of control units in a VCM-based vehicle, according to embodiments of the invention.

Reference is made now to FIG. 2D, which is a schematic block diagram illustration presenting high-level topology of control units in a VCM-based vehicle 100 according to embodiments of the invention. Vehicle 100 may comprise four VCMs installed to its vehicle platform, namely VCMs $150_{L1}$ and $150_{L2}$ on the left side and VCMs $150_{R1}$ and $150_{R2}$ on the right side. Respective controllers 50 of each of the VCMs 150 may be in active communication with vehicle-controller 115 which may include, a VCMs control unit (CSCU) whether as a distinct unit or as added/integrated functionalities. The communication between each of the VCMs and the vehicle-controller 115 may be adapted to exchanged data, control signals, and reflect errors occurring during the operations phases of the VCM and status of the VCM.

According to some embodiments the vehicle in FIG. 2D may be an autonomous vehicle. In this embodiment, a Main Autonomy Computer 233 is installed on the vehicle and is in active communication with the vehicle-controller 115, adapted to exchange control, error and status signals. In some embodiments, vehicle may be human driven, and a Main Autonomy Computer 233 may be included as driver assistance system.

The configuration depicted in FIG. 2D does not show direct communication between the VCMs. A potential advantage of having VCMs that don't communicate with each other, is that control is done via the vehicle-controller 115. In some cases, this simplifies the prevention of sending conflicting signals, for example conflicting steering angles.

Yet, in some embodiments a VCM-to-VCM bus (such as bus 223 of FIG. 2C) may be provided, to enable faster data exchange, improved level of redundancy, and/or distributing computing overload between processors.

Figure 2E:
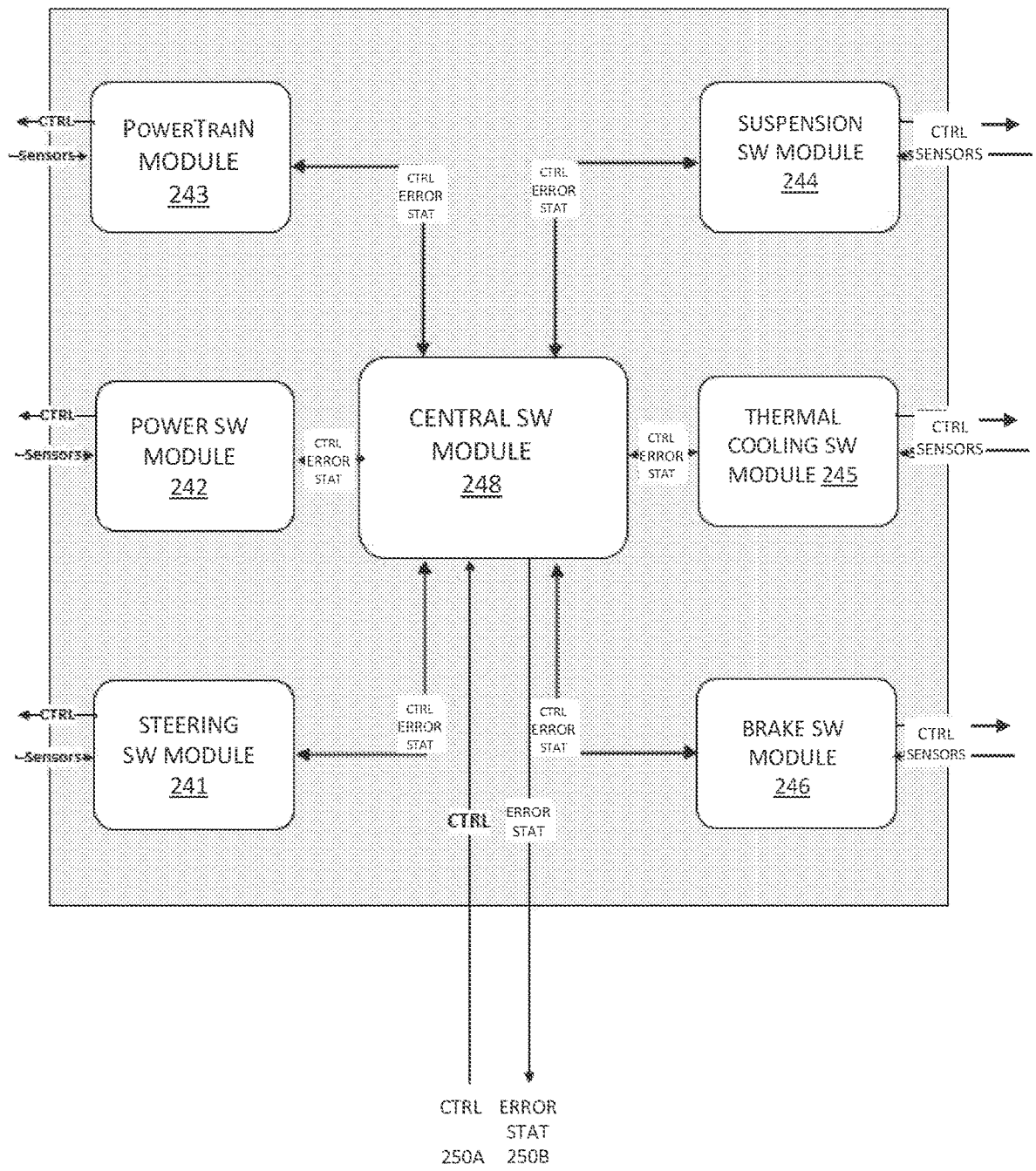
FIG. 2E is a schematic high-level block diagram of software, according to embodiments of the invention.

Reference is made now to FIG. 2E, which is a schematic block diagram of a software (SW) high-level scheme, according to embodiments of the invention. The SW scheme depicts division of SW assignments between SW modules of a vehicle equipped with one or more physical modules where at least one of these modules is controlled by a dedicated SW module. In the SW scheme of FIG. 2E, each of physical modules: steering module, power module, powertrain module, thermal cooling module and brake module has an associated SW module, adapted to provide control signals to control the operation of the associated physical module, and to receive from the module reading of sensors monitoring the operation of the physical module. Accordingly, steering SW module 241, power SW module 242, powertrain SW module 243, suspension SW module 244, thermal cooling SW module 245 and brake SW module 246 are adapted to provide control signals, each to its respective physical module and to receive from its respective physical module sensors signals reflecting the operation of the associated physical module, Each of the SW modules may be in active communication with central SW module 248, winch is adapted to receive control, status and error data from each of the SW modules, to store it and optionally to process the received data according to program lines stored thereon in a non-volatile memory (not shown). Central SW module 248 may be in active communication with vehicle control unit (not shown), for example according to one or more of the control schemes described elsewhere herein. Central SW module 248 is adapted to receive control signals from an external control entity (not shown), such as Autonomous Control unit (not shown). In some embodiments each of the SW modules may be operated on a dedicated computing device (not shown) that may be disposed on, or in close proximity to the physical module it is adapted to control. This way, the respective HW/SW module is capable of full replacement ability simply by the removal of the associated module and replacing it with another such module. In other embodiments two or more of the SW modules may be embodied on a single HW platform, e.g. that is disposed on the vehicle platform. In some embodiments the HW modules of the physical modules may be identical to each other and may vary only by the SW package loaded to the HW module. This arrangement may save costs, may lower the number of on-the-shelf spare modules and may shorten the time needed for removal, installation and SW load-and-tune time.

FIGS. 3A-3G depict various mechanical-electrical configurations of VCMs according to embodiments of the invention. In the following examples various partial combinations of units of a VCM are shown.

Figure 3A:
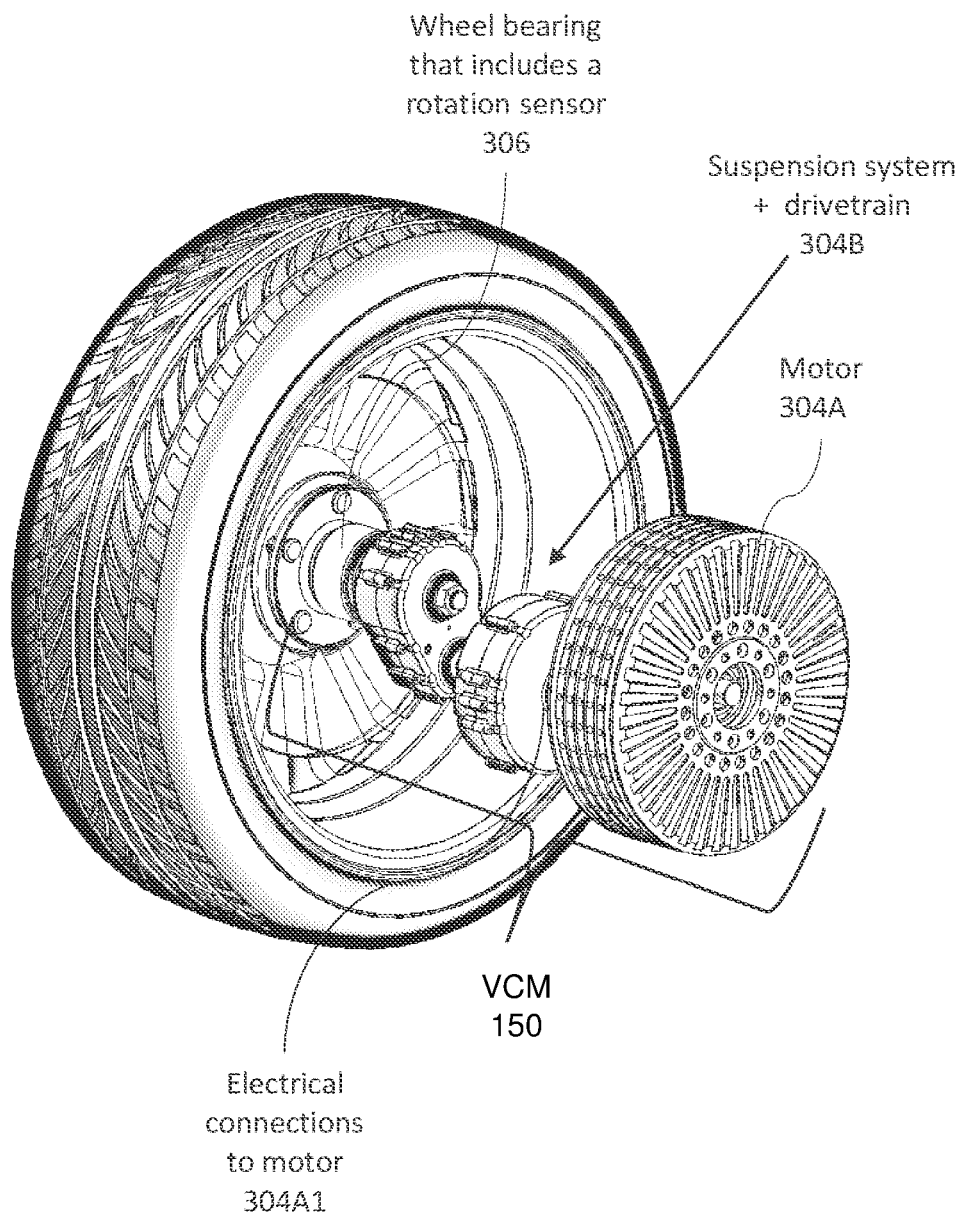
FIGS. 3A-3G depict various mechanical-electrical configurations of VCMs according to embodiments of the invention.

Reference is made now to FIG. 3A, which schematically depicts an isometric drawing of as-installed with a wheel VCM 150. VCM 150 comprises electrical motor 300A driving a suspension unit with drivetrain unit 304B, which are adapted to rotate the wheel. Additionally, in this embodiment rotation sensor 306 may be installed at the wheel bearing to reflect the rotational speed of the wheel. Electrical motor 304A may be connected to electrical power source via power connection 304A1.

Figure 3B:
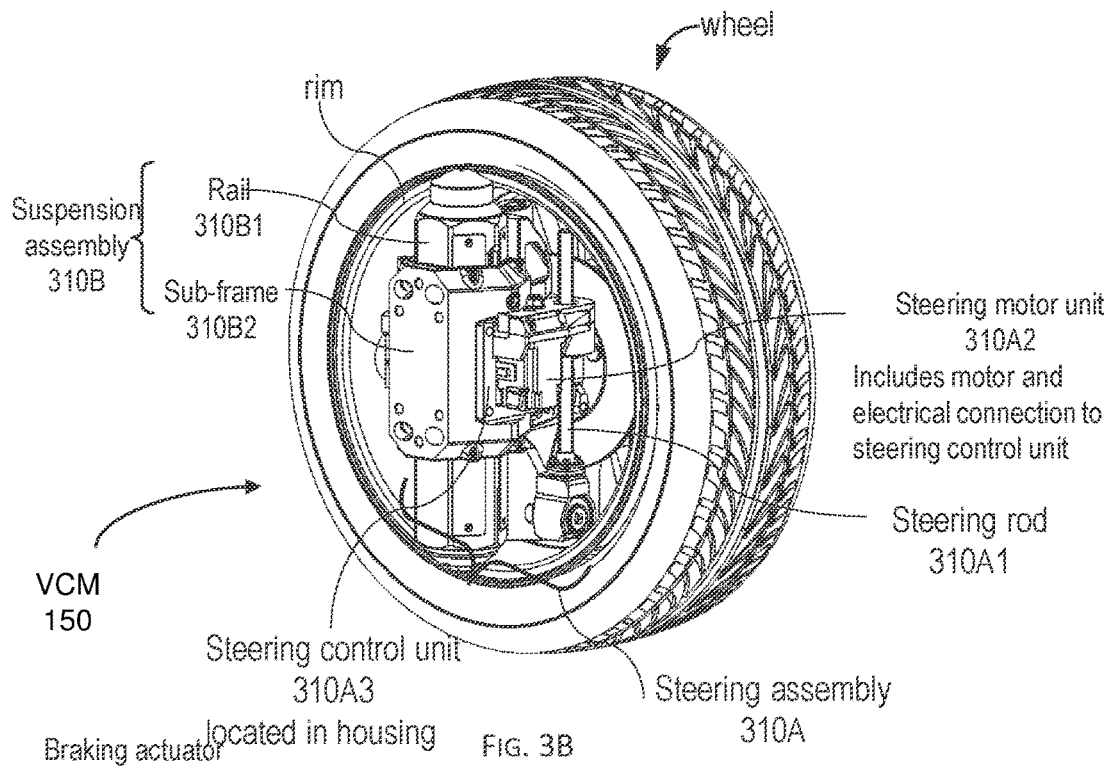

Reference is made now to FIG. 3B, which schematically depicts an isometric drawing of as-installed within a wheel VCM 150. VCM 150 comprises steering assembly 310A, suspension assembly 310B, and braking assembly 310C enclosed at least partially within a rim of a wheel. Steering assembly 310A may comprise, according to embodiments, steering rod 310A1, steering motor 310A2 and steering control unit 310A3. Steering assembly 310A is adapted to receive steering control signals from steering control unit 310A3. In some embodiments, steering control unit 310A3 receives steering control signals from a central controller on a vehicle platform or from a VCM. Suspension system 310B is depicted as system enabling movement of the wheel with respect to a vehicle platform. Suspension assembly 310B may comprise sub-frame 310B2 in which rail 310B1 is moveable. Suspension assembly 310B may further comprise a sensor (not shown) that is adapted to measure suspension expansion/compression.

Figure 3C:
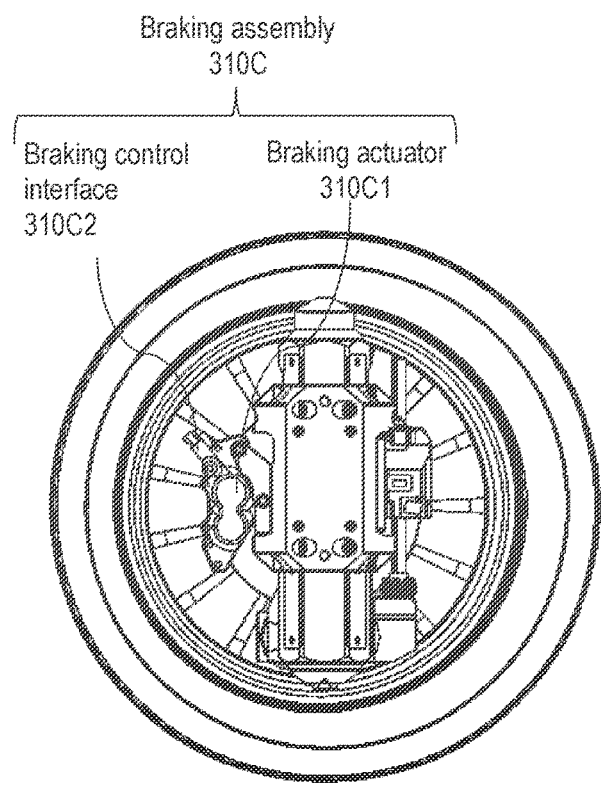
Figure 3D:
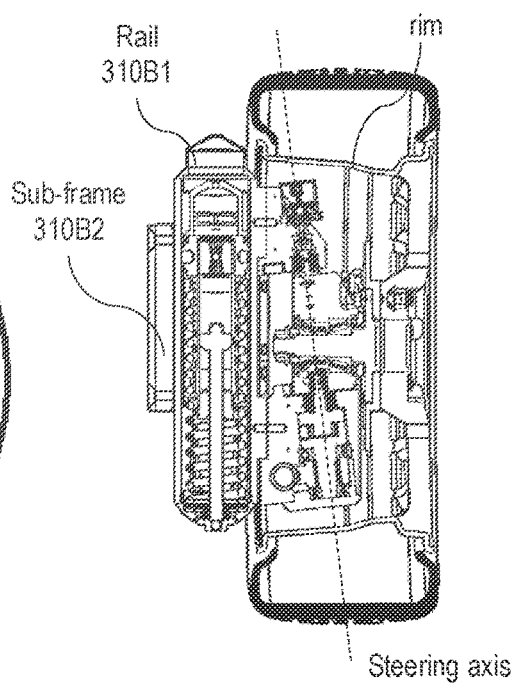

FIGS. 3C and 3D are face view and side cross section view of the VCM embodiment of FIG. 3B, respectively. In FIG. 3C some detail of braking assembly 310C are shown, comprising braking actuator 310C1 and braking control interface 310C2, FIG. 3D depicts another view of sub frame 310B2 and rail 310B1 of suspension assembly 310B.

Figure 3E:
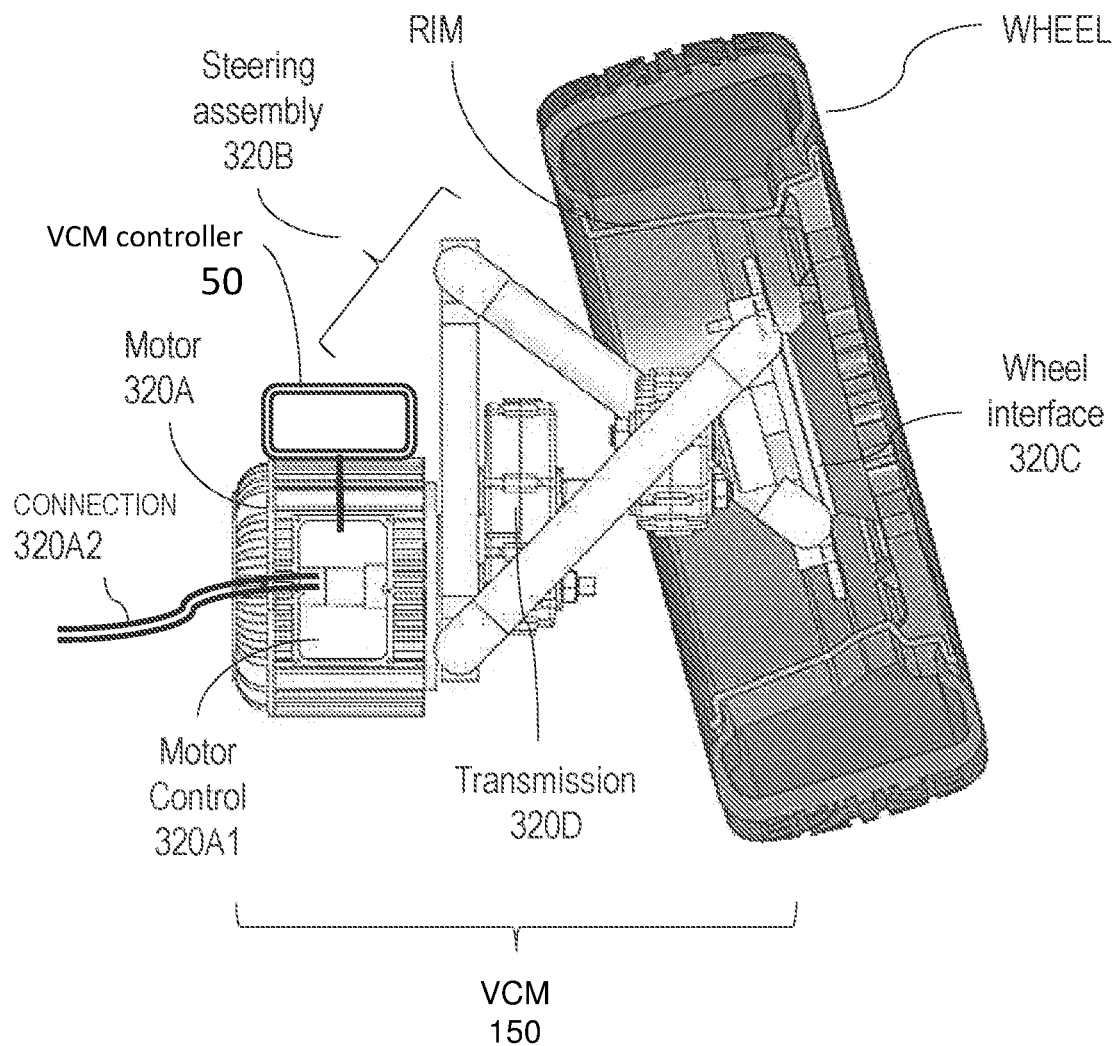

Reference is made to FIG. 3E showing atop cross section view of VCM 150 installed at least partially within a rim of a wheel, according to embodiments of the invention. VCM 150 may comprise motor 320A with control unit 320A1 and motor electrical connection 320A2 to receive power supply from a vehicle platform. VCM 150 further comprises power transmission 320D to provide rotational drive to the wheel interface 320C and steering assembly 320B. The wheel interface may comprise rotation sensor (not shown), to provide data indicative of the rotational speed. Electrical and communication cable 320A2 may provide the required connections to the vehicle platform and/or to other VCMs. In some embodiments VCM controller 50 may be installed as part of VCM 150 systems. Electrical and control connections of steering assembly 320B may be connected to VCM-controller 50.

Figure 3F:
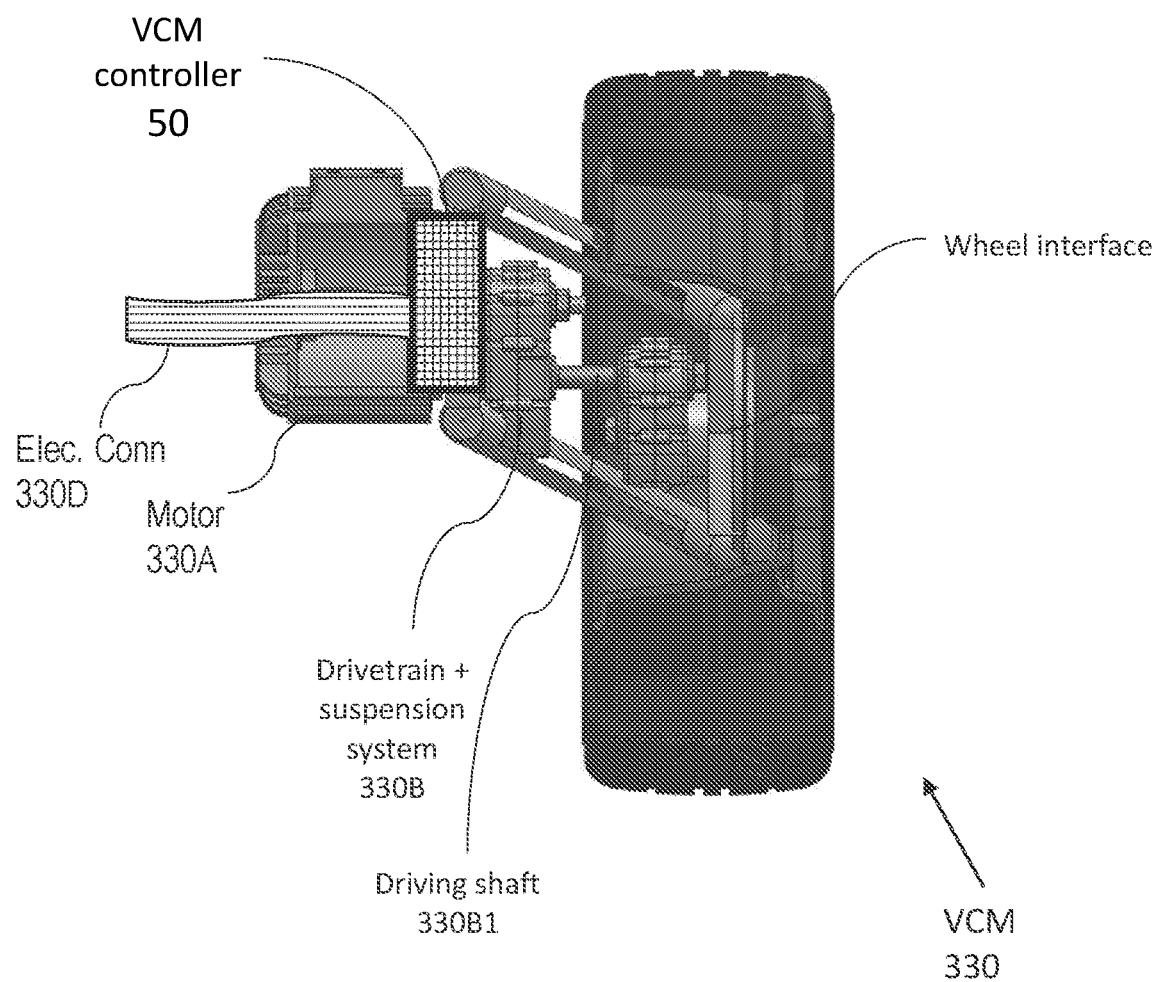
Figure 3G:
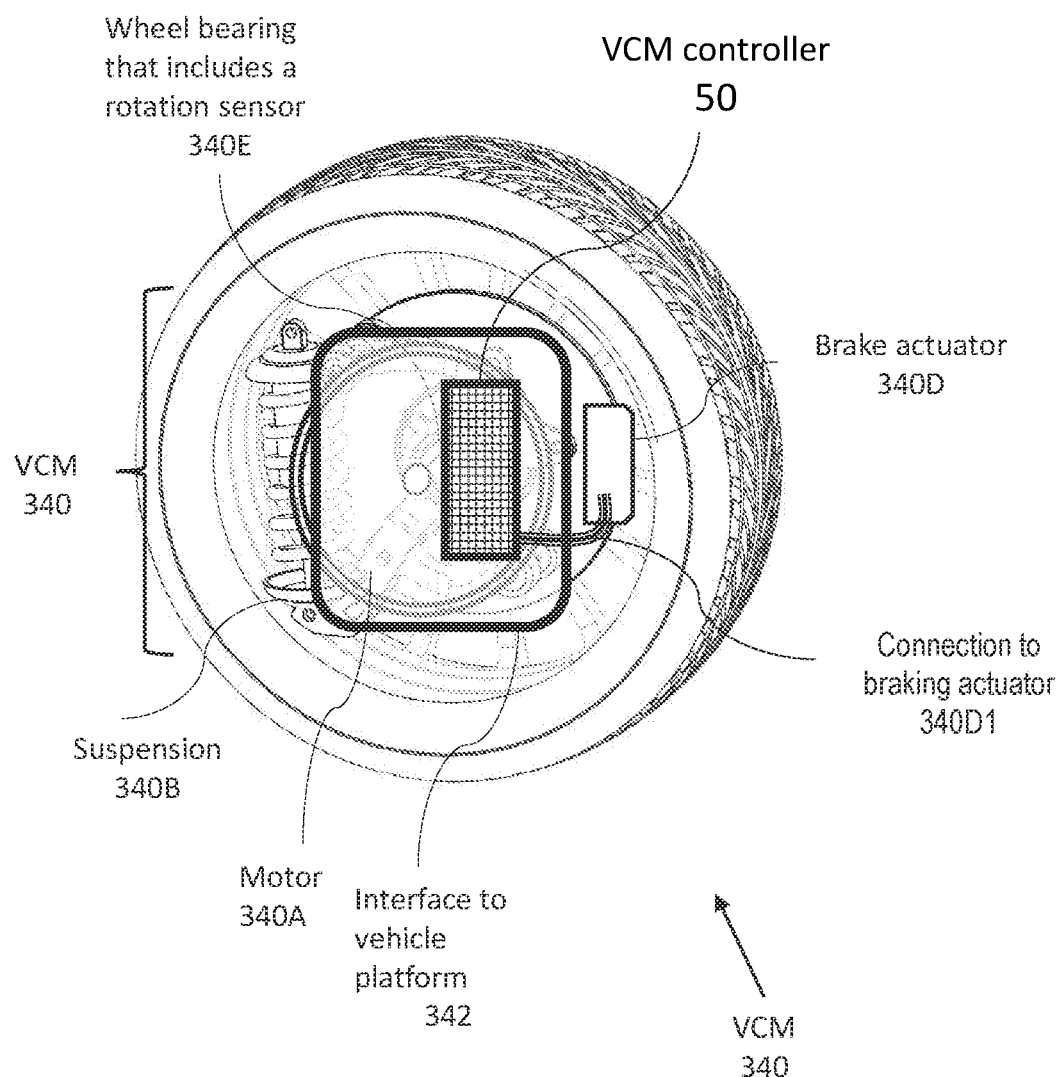

Reference is made to FIG. 3F showing schematic side cross section view of VCM 150 at least partially installed within a rim of a wheel, according to embodiments of the invention. FIG. 3F depict an embodiment of VCM 150 comprising a combined drivetrain and suspension 330B adapted to rotate the wheel via driving shaft 330B1. Electrical and communication cable 330D may provide the required connections to the vehicle platform and/or to other VCMs. In some embodiments VCM-controller 50 may be installed as part of VCM 150 systems. In case when the embodiment comprises steering capability (not shown) its electrical and control cables may be connected to VCM-controller 50. Reference is made to FIG. 3G showing schematic side view illustration of VCM 150 installed at least partially within the rim of a wheel according to embodiments of the invention. VCM 150 may comprise a motor 340A, a suspension assembly 340B, a VCM-controller 50, a brake actuator 340D connected via connection 340D1 to VCM-controller 50 and rotation sensor 340E that may be disposed at the wheel bearing, VCM 150 may be connected mechanically to vehicle platform via an interface module 342. Any one of motor 340A, rotation sensor 340E, brake actuator 340D, and suspension assembly 340B may he connected and controlled by VCM-controller 50. In some embodiments, any one of motor 340A, rotation sensor 340E, brake actuator 340D, and suspension assembly 340B is connected to a designated control unit connected and controlled by VCM-controller 50.

Figure 4A:
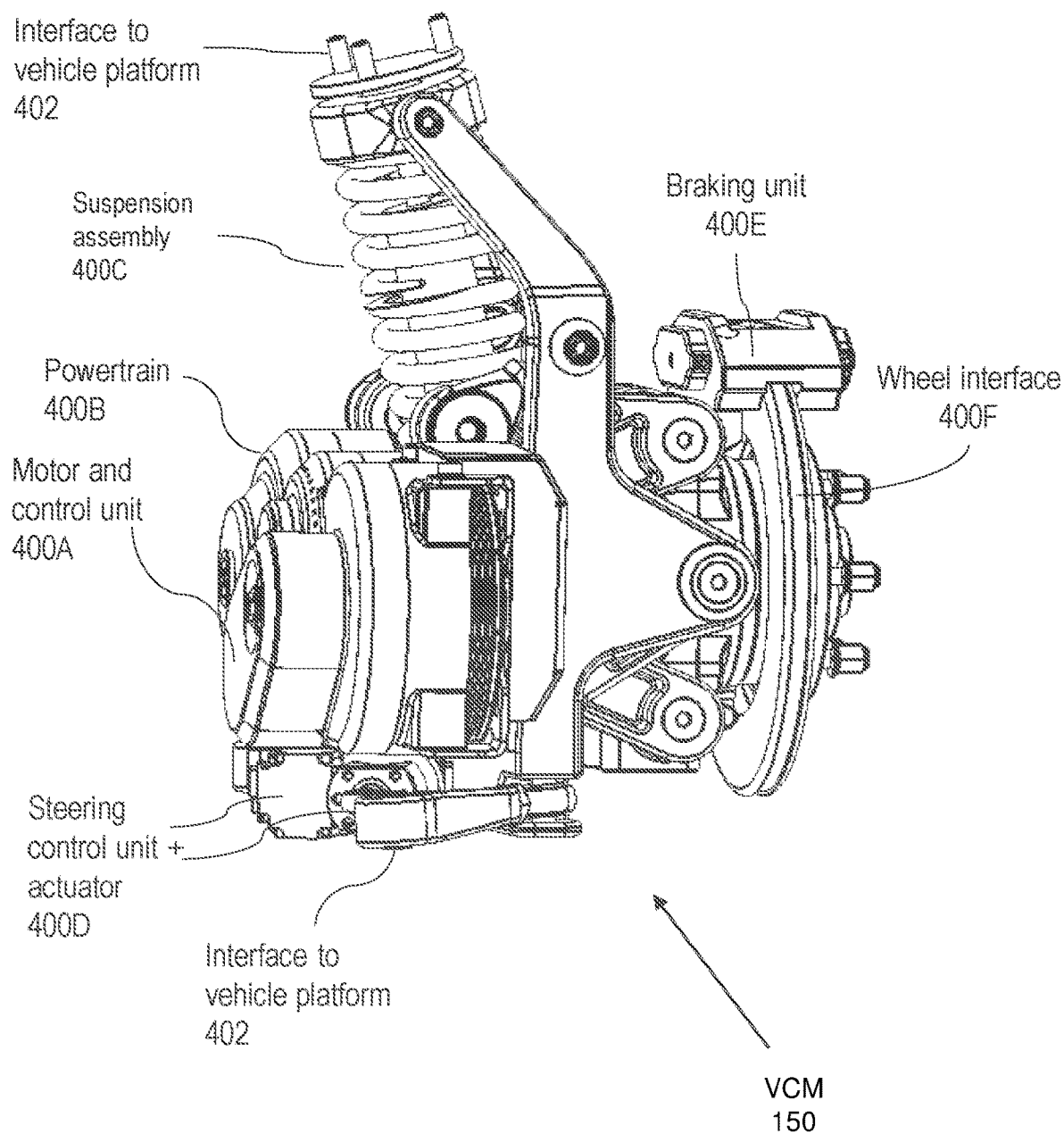
FIG. 4A depicts a schematic 3D illustration of a VCM according to embodiments of the invention.

Reference is made now to FIG. 4A, which depicts a schematic 3D illustration of an embodiment of VCM 150 according to embodiments of the invention. VCM 150 comprises motor and motor control unit 400A, power train 400B, suspension assembly 400C, steering control unit and steering actuator collectively numbered 400D, braking unit 400c and wheel interface 400F, at least part of VCM 150 is adapted to be comprised within the rim of vehicle when it is installed on wheel interface 400F. Any one of a rotation motor unit 400A, sensor (not shown), brake unit 400E, and suspension assembly 400C may be connected and controlled by a VCM control unit (not shown). In some embodiments, any one of the motor, the brake, and suspension assembly may be connected to a designated control unit which may be connected and controlled by the VCM controller (not shown).

Figure 4B:
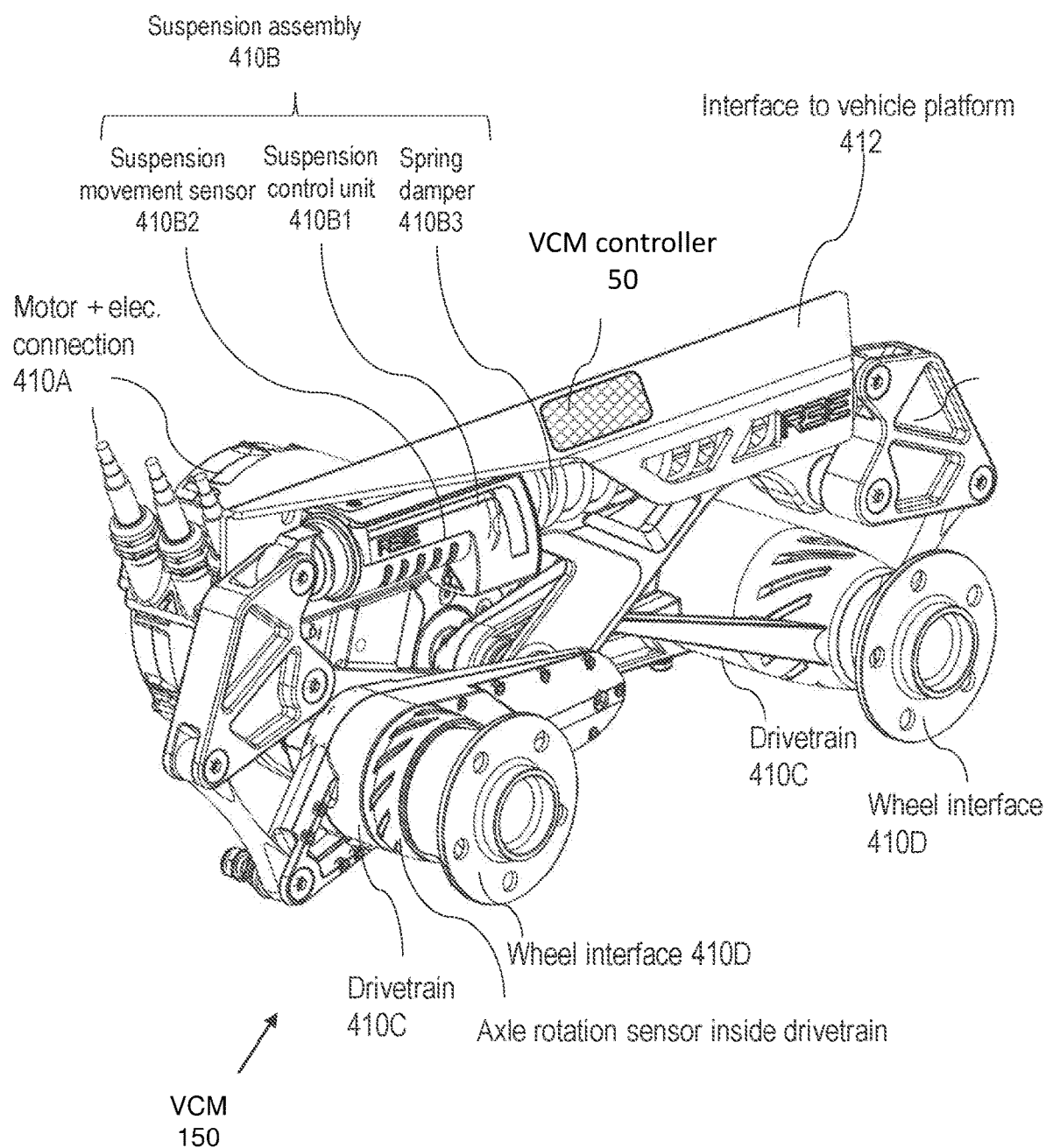
FIG. 4B depicts a schematic 3D illustration of a VCM according to embodiments of the invention.

Reference is made now to FIG. 4B, which depicts a schematic 3D illustration of an embodiment of VCM 150 according to embodiments of the invention, VCM 150 depicts an in-wheel unit for attaching to two wheels. VCM 150 comprises motor and motor electrical connections 410A adapted to drive two wheel interfaces 410D via drivetrains 410C. VCM 150 further comprises suspension assembly 410B which may comprise suspension control unit 410B1, suspension movement sensor 410B2, and suspension spring-and-damper 410B3. VCM 150 may be connected to wheels via wheel interfaces 410D and may be mechanically connected to a vehicle platform via interface 412. VCM 150 may be controlled by VCM controller 50. Any one of motor 410A and suspension assembly 419B may be connected and controlled by VCM controller 50. In some embodiments, any one of motor 410A and suspension assembly 410B is connected to a designated control unit (such as suspension control unit 410B1) connected and controlled by VCM controller 50.

Figure 4C:
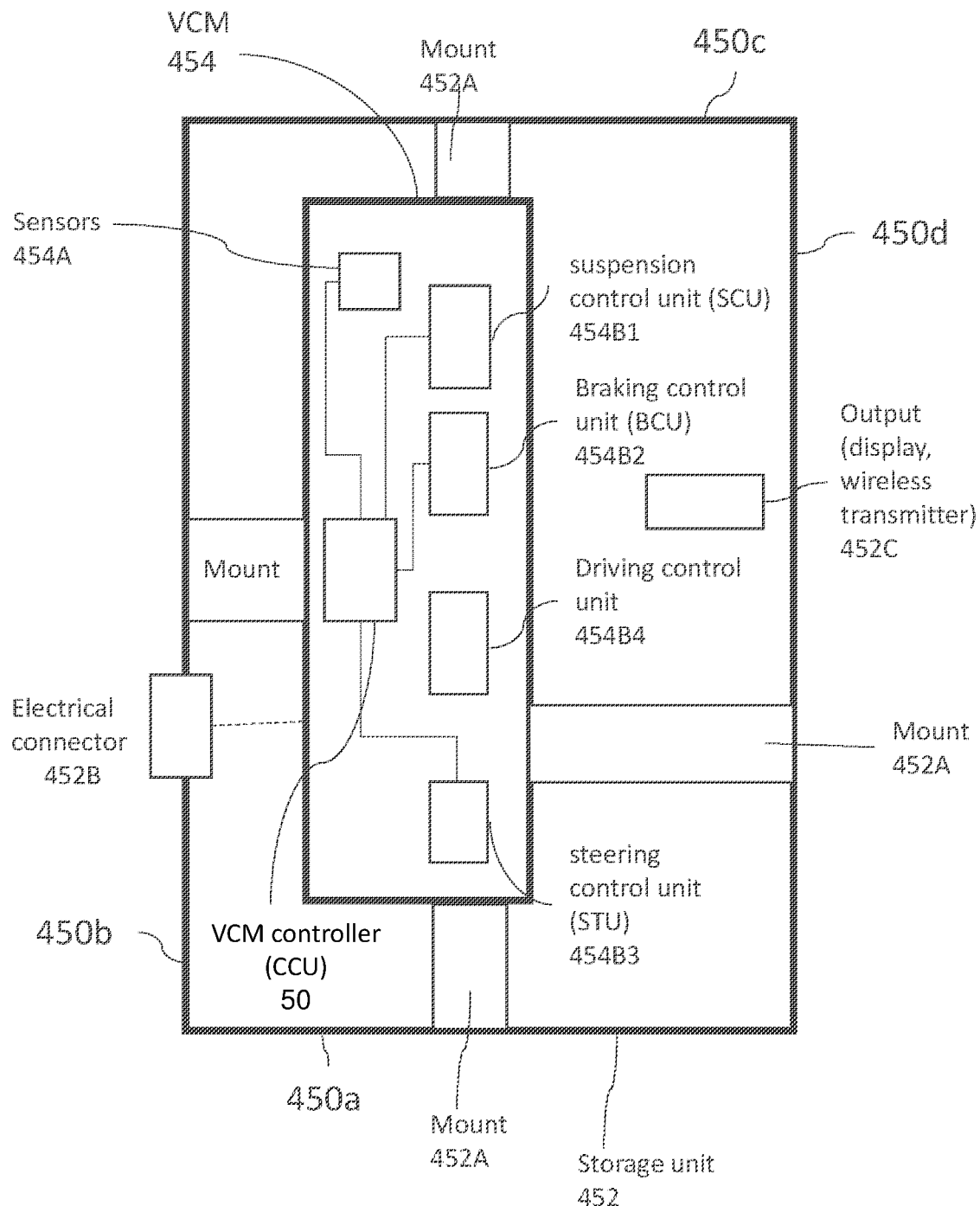
FIG. 4C is a schematic block diagram of a storage unit for storing a VCM according to embodiments of the invention.

Reference is made now to FIG. 4C, which is a schematic block diagram of storage unit 452 for storing VCM 454, according to embodiments of the invention. VCM 454 may be similar to any one of the VCM described above, for example, VCM 150 that was described in FIG. 2A, having VCM controller 50 that may be in active communication with sensors unit 454A and with the following active systems: suspension control unit (SCU) 454B1, braking control unit (BCU) 454B2 and steering control unit (STU) 454B3 and wheel driving control unit 454B4.

VCM 454 may be adapted to be mounted in storage unit 452 via one or more mechanical mounts 452A and at least one electrical and control connector 452B. Any one of mounts 452A may be adapted to support the weight of VCM 454 within storage unit 452, In some embodiments, one or more of mounts 452A contain electrical circuit.

According to some embodiments, storage unit 452 may be provided with controller and control programs (not shown) adapted to perform health tests to the VCM 454 when stored within storage unit 452, as explained herein above. Storage unit 452 may further comprise local output unit 452C (e.g. display, wireless transmitter/receiver, etc.) that may provide VCM test results and enable control of test parameters. One or more mounts 452A may include or comprise one or more form the following sensors: vibration sensor, mechanical load sensor, mechanical moment sensor, and the like. Tests may be performed by activation one or more of the VCM systems according to the test scheme. The testing results may be recorded by the VCM sensors 454A and/or by sensors included in mounts 452A.

Storage unit 452 may be a container having a plurality of walls 450a, 450b, 450c, 450d. Storage unit 452 may be shaped to fit a VCM 454 or may be designed to be adjustable (e.g. by adjustable mounts 452A) to fit a plurality of VCM types. Storage unit 452 may be shaped and sized to accommodate a plurality of VCMs 454 as once. Storage unit 452 may be stationary or may be adapted to be mobile.

Figure 5:
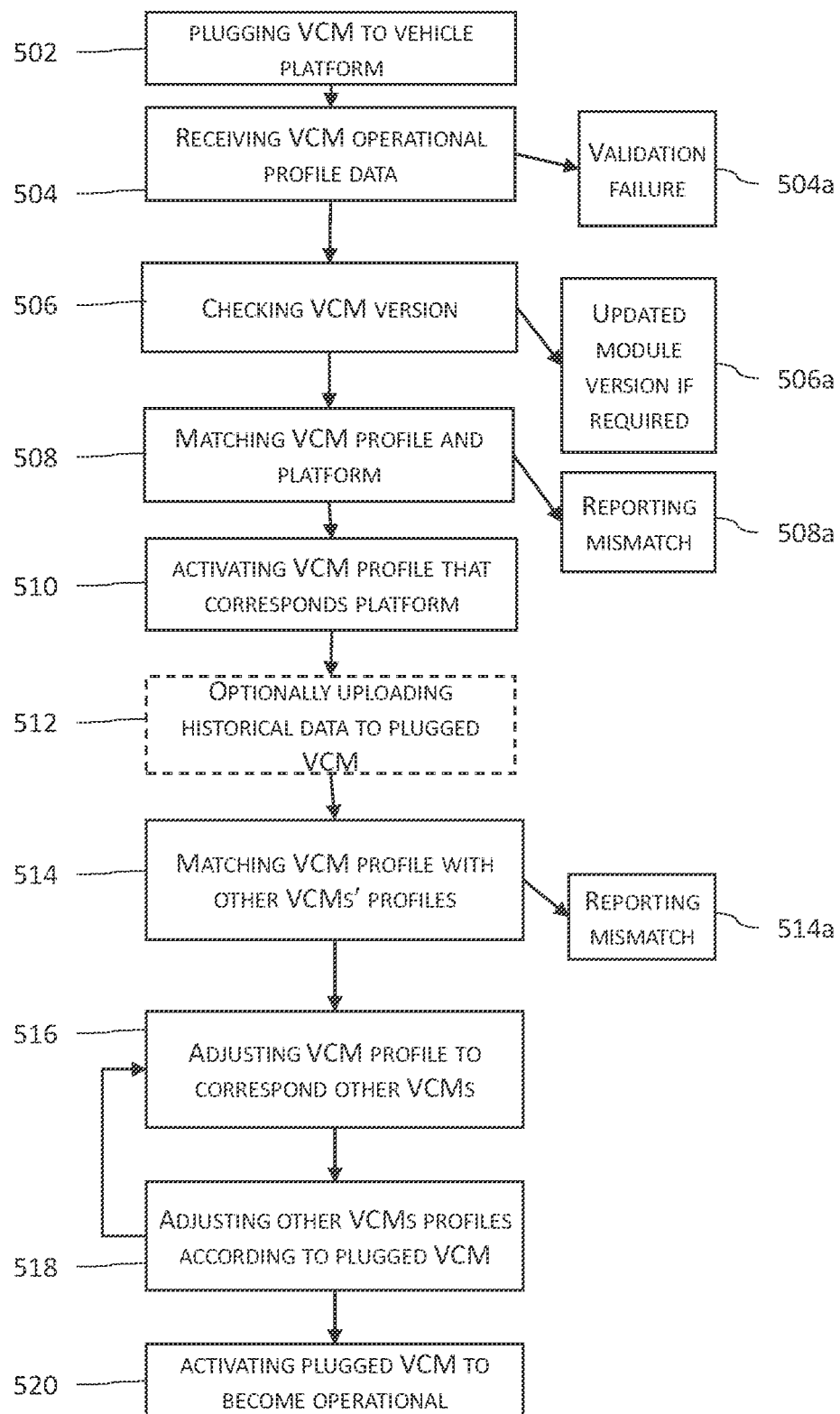
FIG. 5 is a schematic flow diagram depicting steps involved in plugging a new VCM to a vehicle platform, according to embodiments of the present invention.

Reference is made now to FIG. 5, which is a schematic flow diagram depicting steps involved in plugging a VCM to a vehicle platform, according to embodiments of the present invention. A VCM may be plugged to the vehicle platform in step 502. In some embodiments, plugging step 502 is of a new VCM, not mounted earlier to the vehicle platform. In some embodiments, plugging step 502 is of a VCM, which has been installed on the vehicle platform in the past. According to some embodiments, plugging is by a human operator (e.g. technician, driver, fleet professional), in some embodiments, plugging is by a robotic system. The VCMs operational profile data is received by the platform in step 504.

The VCM version is checked in step 506. If VCM validation fails, a notice is issued in step 506a. Failure notice may be provided to an operator and may be visual or by sound. Failure notice may be an output transmitted to another device. Failure notice may be provided by the VCM and/or by the vehicle platform, and/or a device connected to the VCM. In some embodiments, if the VCM version needs to be updated an update takes place at step 506b.

The VCM profile and the platform profile are matched in step 508 and if matching fails tins is reported in step 508a. In some embodiments, reporting 508a is followed by unplugging of VCM and terminating the plugging a VCM to a vehicle platform process. Reporting 508a may be to an operator and may be visual or by sound. Reporting 508a may be an output transmitted to another device. Reporting 508a may be provided by the VCM and/or by the vehicle platform, and/or a device connected to the VCM.

At step 510 the newly installed VCM is activated using a profile that matches the vehicle's profile. According to some embodiments, a profile is selected from profiles database stored at the VCM. In some embodiments, profiles database is stored at the vehicle platform. In some embodiments, profiles database is stored at a remote storage unit (device, computer, cloud). According to some embodiments, selected operational profile includes activating/deactivating of system related to steering and/or braking and/or driving of the VCM. According to some embodiments, profile includes operational parameters that fit the performance of the vehicle. In some embodiments, profile includes operational parameters that fit a driver profile. In some embodiments, profile includes predictive operational parameters according to planned operation of the vehicle (e.g. time, distances, speed, weather, road conditions).

The VCM historical data may optionally be loaded at step 512. In some embodiments, historical data may be operational data of the vehicle platform. In some embodiments, historical data may be operational data of the VCM. In some embodiments, historical data may be of planned operation of the vehicle. In some embodiments, loading historical data 512 is followed by analyzing 513 the historical data. In some embodiments, a warning is provided when analyzing 513 results in conflicting with expected operation of the VCM and/or the vehicle platform (e.g. time to maintenance is short to allow predictive operation).

After the VCM has been activated, its profile is matched with those of other VCMs of the vehicle at step 514. According to some embodiments, if a mismatch is found it is reported in step 514a (reporting method can be similar to those listed above).

At step 516 the profile of the new VCM is adjusted to those of the other VCMs of the vehicle, At step 518 the profiles of the other VCMs are adjusted to that of the new VCM, thereby creating closed loop, until a required adjustment has been achieved. When adjustment of all VCMs has successfully finished the activation of the newly installed VCM becomes operational at step 520.

Reference is made now to FIG. 6, which is a chart detailing which elements of a system that comprises one or more VCMs, are involved in the performance of each of certain operations that may take place during operation and maintenance of a vehicle having VCMs, according to embodiments of the invention.

Figure 7A:
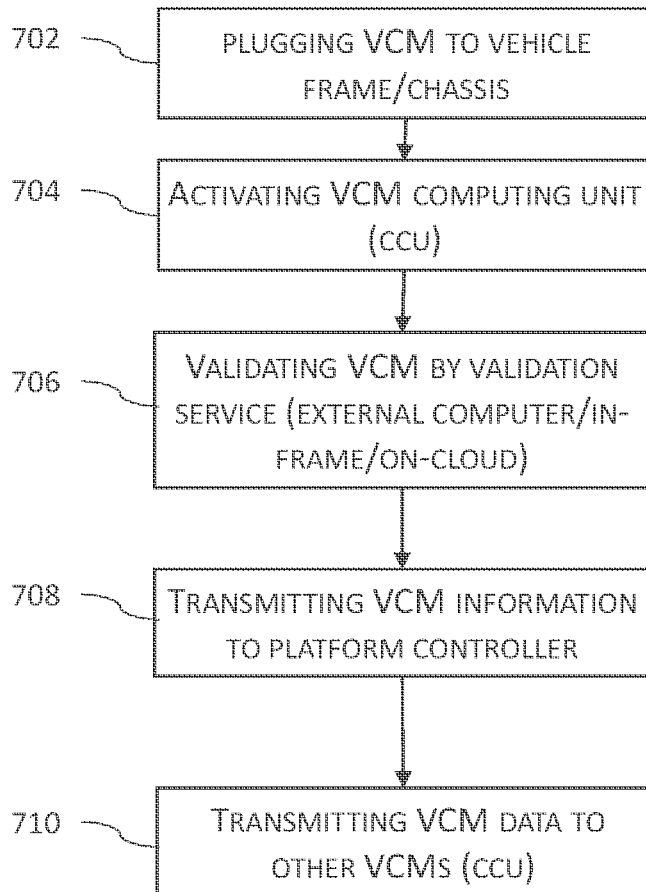
FIGS. 7A and 7B are schematic flow diagrams depicting processes of matching a newly installed VCM with a vehicle platform and with other VCMs, and optional additional process, respectively, according to embodiments of the present invention.
Figure 7B:
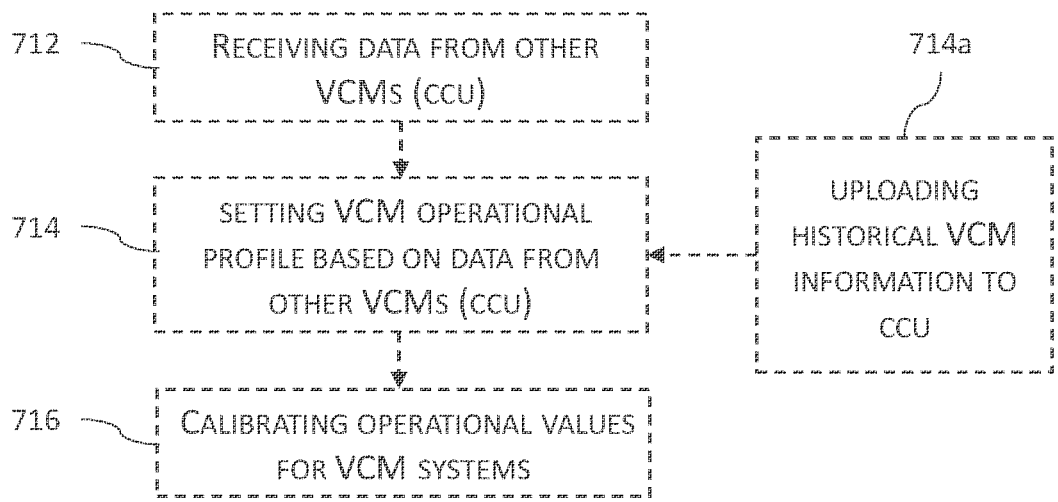

Reference is made now to FIGS. 7A and 7B, which are a schematic flow diagrams depicting processes of matching a newly installed VCM with a vehicle platform and with other VCMs, and optional additional process, respectively, according to embodiments of the present invention, A new VCM is plugged to vehicle platform in step 702 and a controlling unit at the VCM is activated in step 704. The VCM may be validated by one of a remote/external computer, by the vehicle platform controller or by a remote, in-cloud service in step 706, The VCM's information is transmitted to the vehicle platform controller in step 708 and then it is transmitted to other VCMs of the vehicle in step 710, to finish the process.

The following steps (712 to 716) are optional: in step 712 data from the other VCMs may be received and in step 714 the operational profile of the newly installed VCM may be set based on data from the other VCMs. If historical info of the new VCM is required it may be loaded in step 714*a*, in order to optimize the results achieved in step 714. Finally, in step 716 operational parameters of the VCMs are calibrated to match operation with the vehicle systems.

Figure 8:
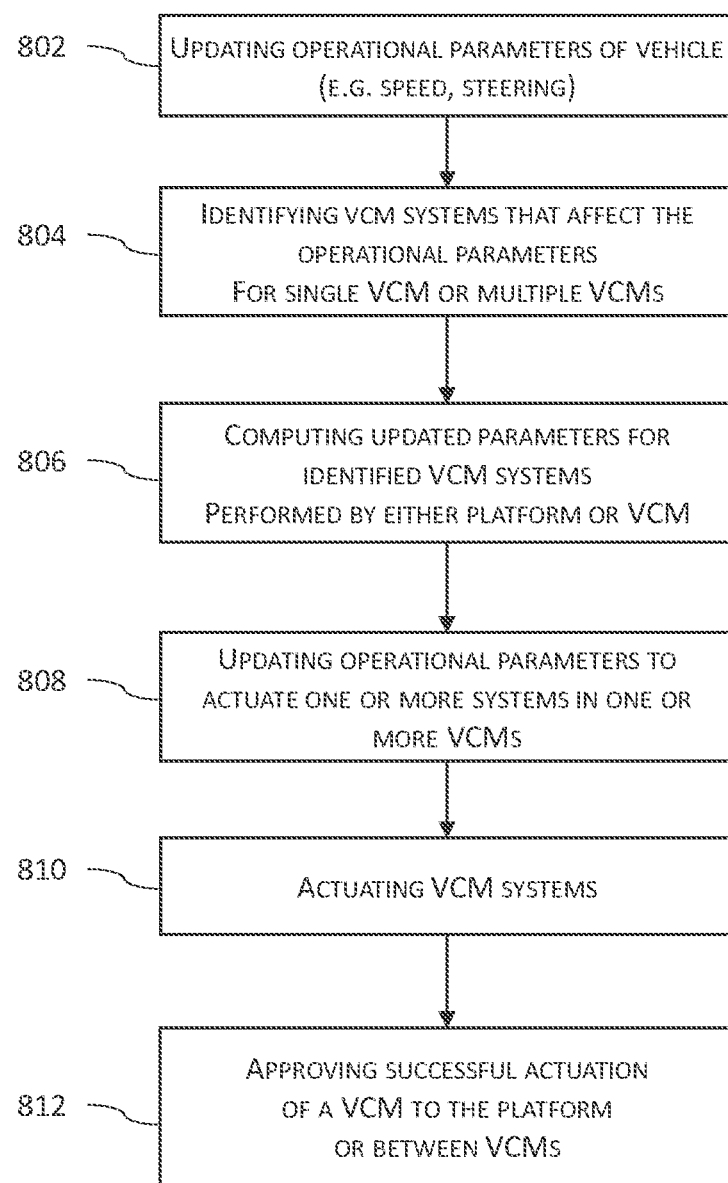
FIG. 8 is a schematic flow diagram depicting processes of calibrating a newly installed VCM, according to embodiments of the present invention.

Reference is made now to FIG. 8, which is a schematic flow diagram depicting processes of updating operational VCM installed on the vehicle platform, according to embodiments of the present invention. When a VCM is installed and activated, the operational parameters of the vehicle may be updated (step 802). Updating step 802 may be during the operation of the vehicle, e.g. changing speed and or steering, while driving. Updating may be as part of servicing procedure.

Updating 802 is followed by identifying (step 804) one or more of the systems of the one or more VCMs that may support the required updated operational parameters of the vehicle.

Updated parameters are now computed for the identified VCM systems (step 806). The computing may be done by computing units on the vehicle platform or at the VCM as the case may be. Following the computing step 806 operational parameters for actuating one or more of the systems in one or more VCMS are updated (step 808). After the update step 808, the VCM systems are actuated (step 810) and approval of successful actuation of systems of the VCM is provided to the vehicle platform and/or the other VCMs (step 812).

One or more of the steps of identifying 804, updating 808, actuating 810, and approving 812, may include data exchange between VCM and VCM systems control unit are described elsewhere above.

Figure 9:
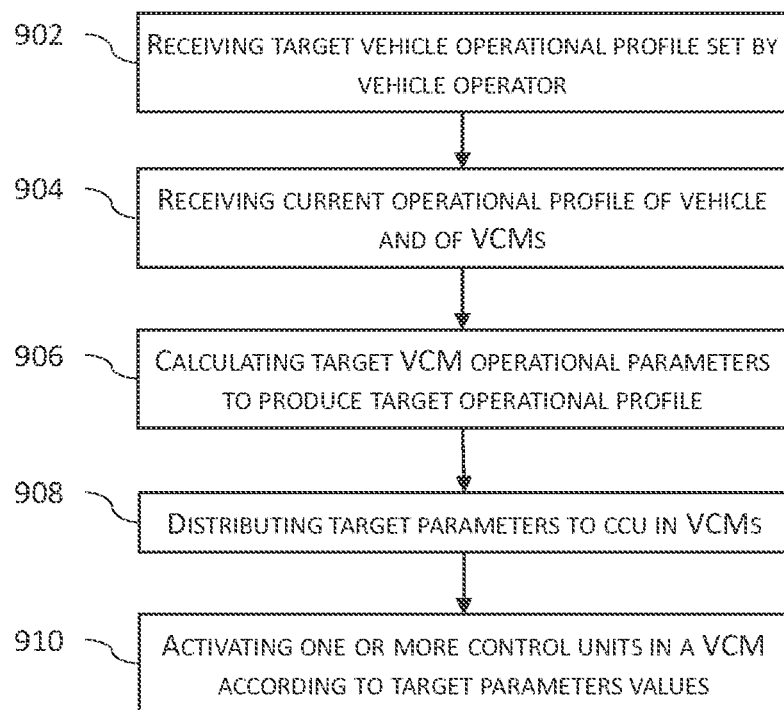
FIG. 9 is a schematic flow diagram depicting a process of calculating operational parameters for a newly installed VCM, according to embodiments of the present invention.

Reference is made now to FIG. 9, which is a schematic flow diagram depicting a process of updating operational parameters for an installed VCM, according to embodiments of the present invention.

Target operational profile set is received from the vehicle operator (step 902). Target operational profile may be provided during one or more of the operations of the vehicle, a servicing procedure, and an initial activation.

Setting target profile (902) is followed by receiving (904) of current operational profile of the vehicle from the vehicle platform controller and/or from the one or more controlling units of the one or more VCMs.

Figure 10:
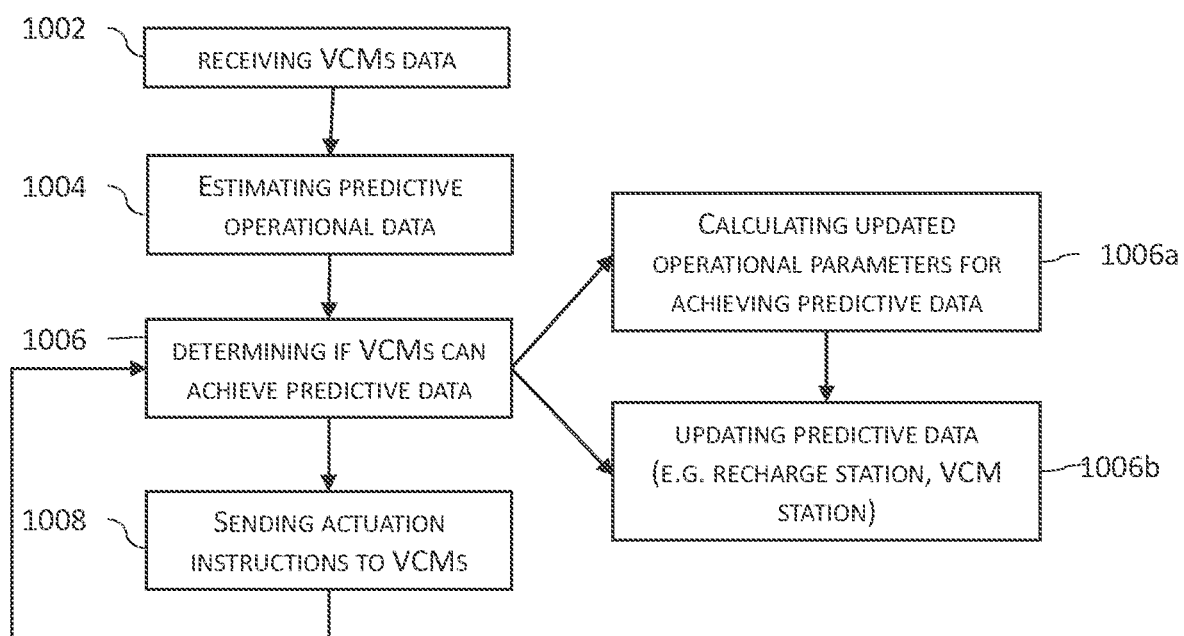
FIG. 10 is a schematic flow diagram depicting process for adapting actual operational parameters based on predictive operational parameters, according to embodiments of the present invention.

Based on the above target VCM operational parameters and current operational profiles, target operational profile parameters may be calculated (step 906). Calculating 906 can be by computing units located at the vehicle platform, the VCM, and/or a remote computing unit, The calculated operational parameters may be distributed (step 908) to one or more control units in one or more VCMs control runts may transmit updated actuation signals to the systems in the VCMs in accordance to the target parameters values, Reference is made now to FIG. 10, which is a schematic flow diagram depicting process for adapting actual operational parameters based on predictive operational parameters, according to embodiments of the present invention. The process may begin by receiving data indicative of the VCM required performance (step 1002) and continues with estimating of the predictive operational performance of the VCM (step 1004), Next, based on the previous steps it is determined whether the VCM is able to achieve the predicted performance (step 1006). At this step updated operational parameters may be calculated in order to achieve the predictive data (step 1006*a*) and optionally the predictive data is update accordingly (step 1006*b*).

Activation instructions that may be based on the calculated updated predictive data may now be sent to the one or more VCMs (step 1008) and be determined again, in closed loop, in step 1006. In case calculating 1006*a* results in a failure of providing updated operational parameters, failure is provided. One or more of the steps of determining 1006 and calculating 1006*a* can be by the computing units located at the one or more of vehicle platform, the VCM, and/or a remote computing unit.

Figure 11:
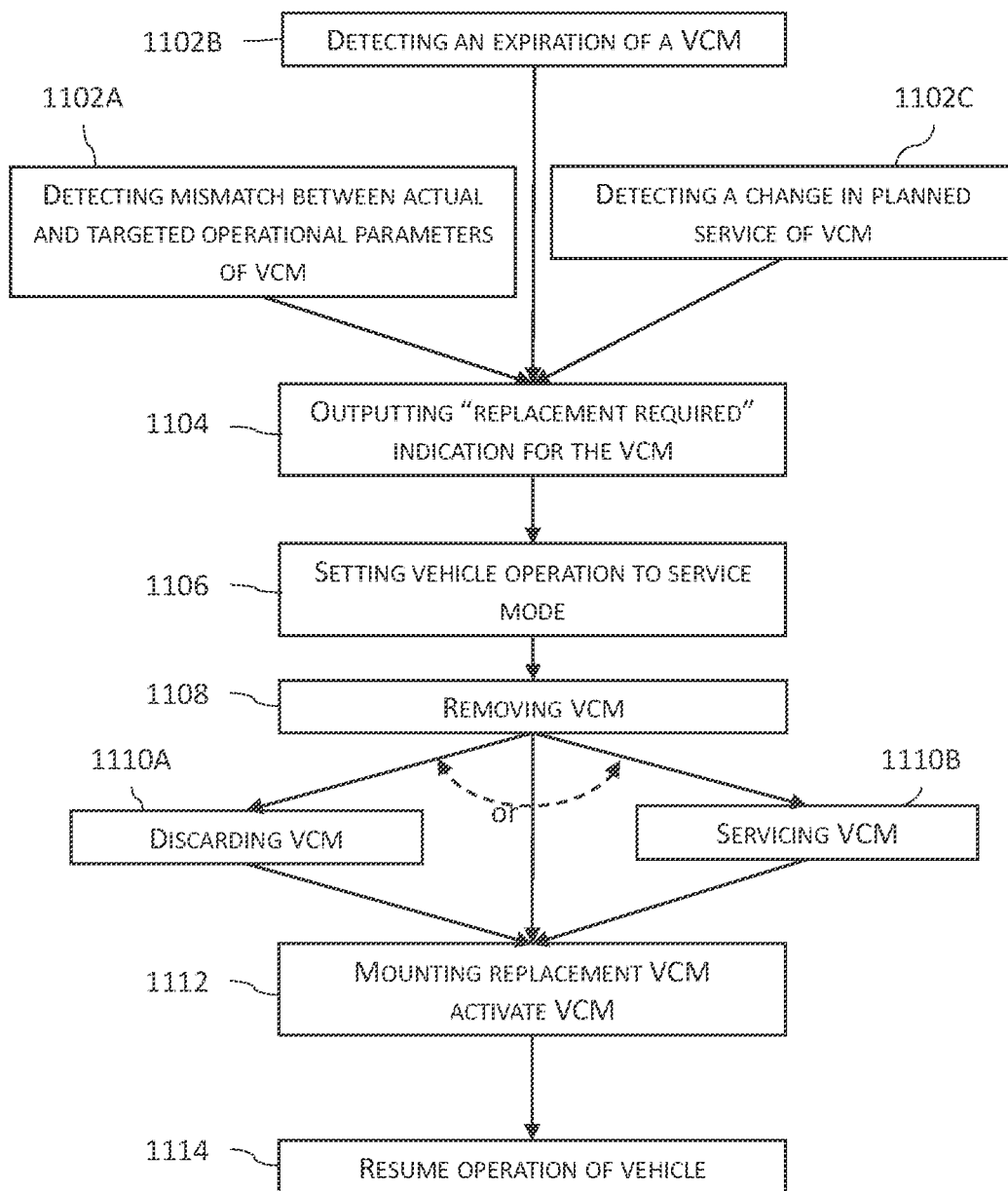
FIG. 11 is a flow diagram depicting process for replacing a misfunctioning VCM, according to embodiments of the invention.

Reference is made now to FIG. 11, which is a flow diagram depicting a process for replacing a VCM, according to embodiments of the invention.

A VCM may be identified as requiring replacement, for example in one of the following paths: a mismatch has been detected between the target operational parameters of the VCM, and the actual operational parameters, that exceeds a predetermined threshold (step 1102A), in case the expiration of the VCM has been detected (step 1102B) or in case a change in the planned service program has been detected (step 1102C).

If it was determined that the VCM need to be replaced a signal expressing "replacement is required" will be issued (step 1150) and the operation mode of the vehicle will be set to service mode (step 1106).

The misfunctioning VCM is removed from the vehicle platform (step 1108) and according to its actual state it may be discarded (step 1110A) or be serviced (step 1110B).

Regardless of the actual state of the removed VCM, a replacement VCM may be mounted to the vehicle platform and is activated (step 1112) and the replacement operation resumes (step 1114).

Figure 12A:
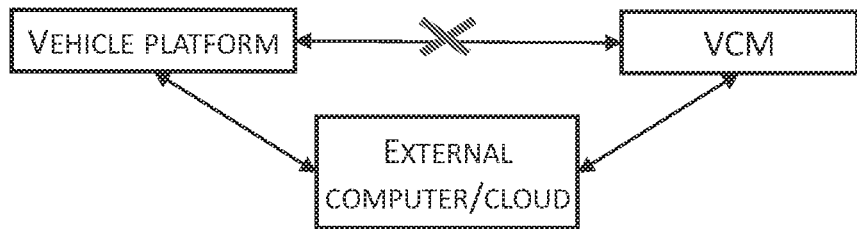
FIGS. 12A and 12C are schematic block diagrams depicting communication and control flows between units of a vehicle in some exemplary situations according to embodiments of the invention.
Figure 12B:
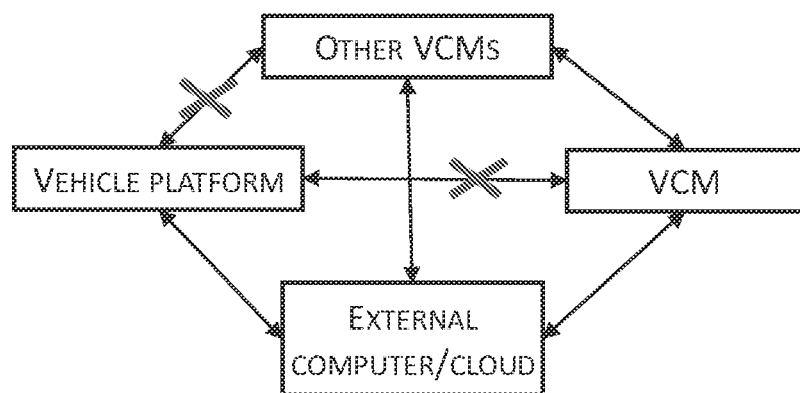
Figure 12C:
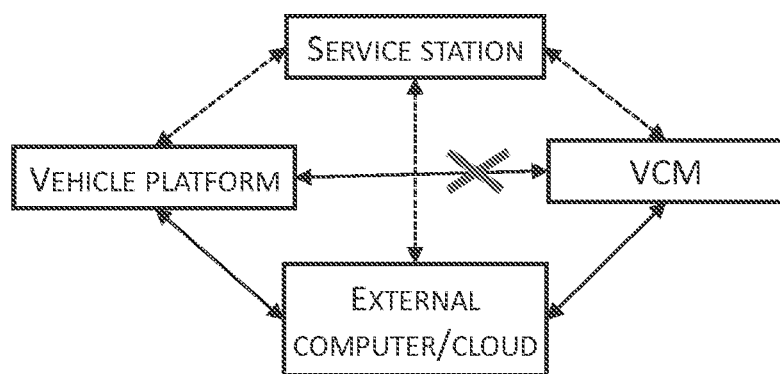

Reference is made now to FIGS. 12A-12C, which are schematic block diagrams depicting communication and control flows between units of a vehicle in some exemplary situations according to embodiments of the invention. In all three examples a vehicle platform may be equipped at least with power source and VCM system controller where the system controller may be disconnected from other runts, as the case may be in the examples below. Each the VCM modules in the examples below may be equipped at least with one or more from the list comprising motor unit, steering unit, braking unit, suspension unit and a VCM controller—per the following examples. In all of the following examples the communication between the vehicle platform controller and the VCM control runt may be disconnected. Other communication lines may also be disconnected. In the examples below a disconnected communication line is marked with a red cross on it.

FIG. 12A depicts a basic communication arrangement of a platform vehicle communicating with a VCM via an external or remote computer to bypass the disconnected direct line between them.

FIG. 12B depicts a configuration including a vehicle platform with more than one VCM and an external/remote computer, where the direct communication lines between a single VCM and the platform and between the platform and several VCMs are disconnected. This configuration exemplifies how the communication of all VCMs with the platform is performed via the remote/external computer, and communication between the VCMs may strengthen it.

FIG. 12C depicts a scenario in which in a vehicle the vehicle platform is disconnected from direct communication with a VCM but has communication line with a remote/external computer and with a service station. A communication line is also active between the remote/external computer and the service station. As seen here the communication between the platform and the VCM may be performed via two alternative paths—via the service station and/or via the remote/external computer.

Figure 13:
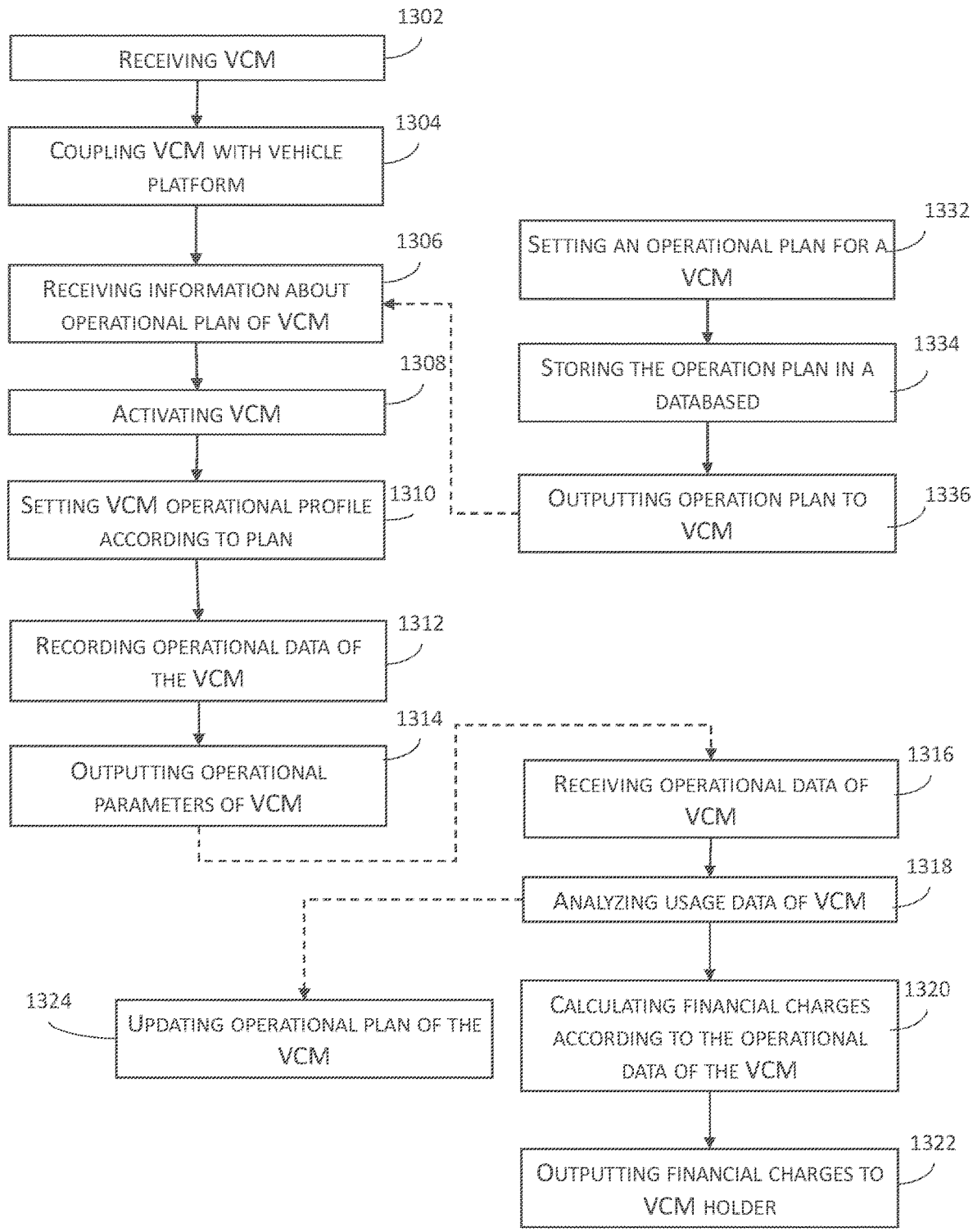
FIG. 13 is a schematic flow diagram depicting process for operating VCM and communicating operational data, according to embodiments of the present invention.

Reference is made now to FIG. 13, which is allow diagram depicting process for operating VCM and communicating VCM data with other systems, according to embodiments of the invention.

The operation of a VCM may be associated with systems and processes that contribute to the operational parameters and the selection of operational profile. The operation of a VCM may also be associated with systems and databases used for financial purpose and business transactions. Cost of usage may serve for business transactions such as rental of vehicle, rental of VCMs, service plans, subscription services. Some examples of operational parameters that can be communicated with other systems may be: distance traveled, hours operated, accelerations (max, frequency), all of these provide data that can correlate with VCM wear rates. Operational data may be compared to planned values. Planned values may be part of a business plan defined for the VCM and/or the vehicle, e.g. during purchasing the VCM, renting the VCM, purchasing/subscribing to service plan for the VCM (e.g., VCM-as a service), and purchasing usage plan. Financial data may relate to information used in insurance plan. Insurance plan can be of a VCM and/or a vehicle. Insurance plan cost may be based on historical data of the VCM. According to some embodiments, operation of the VCM may be controlled according to financial data and financial considerations. In some embodiments, performance (operational profile) of the VCM is selected as a dependency of selected plan. In some embodiments, performance (operational profile) of the VCM is selected as a dependency of actual VCM data with respect to a preceding plan. As shown in FIG. 13, operation of the VCM may include the following elements; receiving corner module (1302), receiving (1302) may be according to a plan set for the vehicle platform, for operator profile, etc. As described elsewhere above, the VCM is coupled (1304) to a vehicle platform. Prior to activating (1308) of the VCM there may be a step of receiving (1306) information about operational plan set for the VCM. Setting of the VCM profile (1310) may be in according to a plan, Operational data of the VCM may be recorded (1312) to be used by other systems after outputting (1314) the recorded operation data of the VCM. Other systems, which may be financial system, may receive (1316) the operational data Received data, can be used for analyzing (1318) usage of data of the VCM, and calculating (1320) financial charges according to the analyzed data. Financial charges may be outputted (1322) to VCM holder. In some embodiments, analyzed data may be outputted for updating (1324) the operational plan of the VCM.

As shown in steps 1330 to 1336, the plan can be based on a business plan set for the VCM, The operational plan of the VCM may be set (1332), stored (1334) in a database, and outputted (1336) as required to another device (e.g. external computer, cloud, vehicle platform computing unit, and corner module computing unit).

Figure 14A:
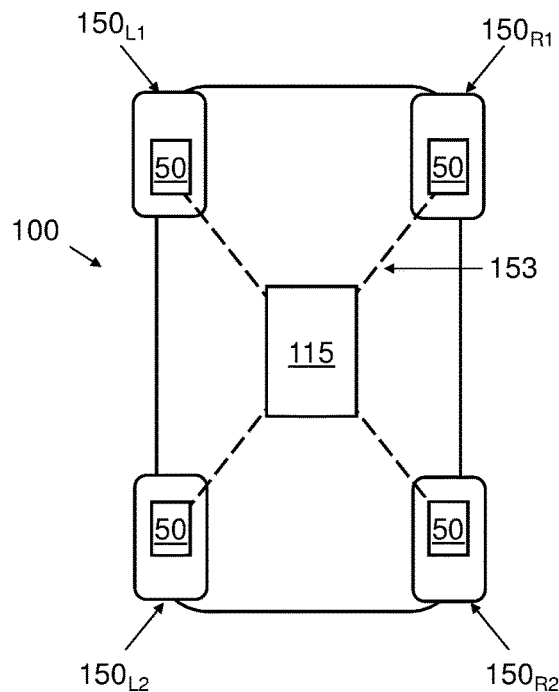
FIGS. 14A and 14B are schematic drawings of vehicles comprising a communications bus and a plurality of VCMs, according to embodiments of the present invention.
Figure 14B:
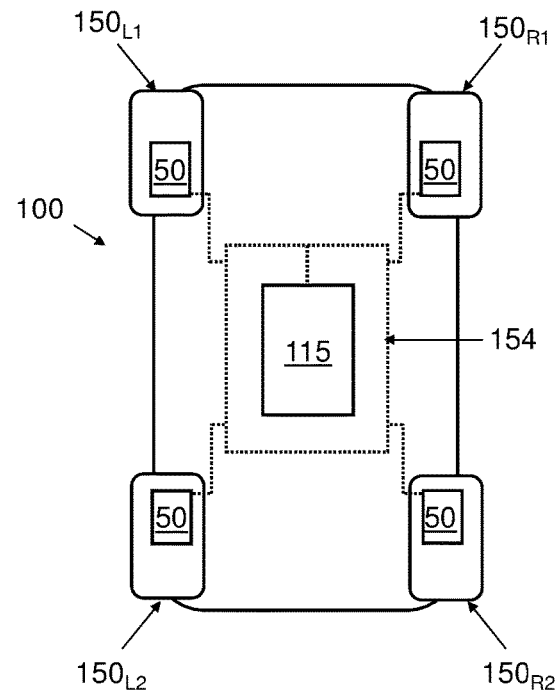
Figure 14C:
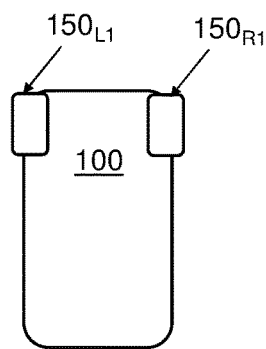
FIGS. 14C and 14D are schematic drawings of vehicles comprising a single pair of opposing VCMs, according to embodiments of the present invention.
Figure 14D:
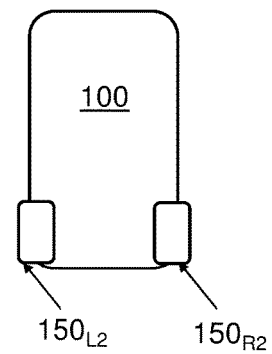

We now refer to FIGS. 14A-14D, which show examples of wheeled vehicles 100 according to embodiments. While only four-wheeled vehicles are illustrated, the embodiments of the invention can be practiced in vehicles having a smaller or larger number of wheels. FIGS. 14A and 14B show a vehicle 100 having four VCMs 150 installed, i.e., one at each corner, and each VCM 150 includes a respective onboard (i.e., VCM-onboard) VCM-controller 50. The vehicle 100 of FIG. 14A includes a communications bus 153 that enables electronic communication between the vehicle-onboard vehicle-controller 115 and each one of the four VCM-controllers 50. The communications arrangements are thus similar to those shown in FIG. 2D, in which communication between a vehicle controller and the respective VCM-controllers is enabled, but direct communication between and among the VCM-controllers is not enabled by the communications bus that is shown; in some embodiments the communications bus 153 can be expanded to include VCM-VCM communications.

The vehicle 100 illustrated in FIG. 14B includes a communications bus 154 that connects the VCM-controllers 50 to each other. In some embodiments, as is shown in FIG. 14B, the communications bus 154 can additionally enable communication between the vehicle-controller 115 and any one or more (or all) of the VCM-controllers 50. An example of a communications bus 153 or 154 is a multi-master serial bus configured as a controller area network (CAN) bus. In some embodiments (not shown), physically separated and/or assigned, e.g. permanently or temporarily assigned, communications channels can be implemented between specific endpoints alongside the bus or as extensions of the bus. For example, a VCM controller can be in such 'direct-channel' communications with sensors deployed within a respective VCM.

As shown in the examples of FIGS. 14A and 14B, a vehicle 100 can include multiple pairs of opposing VCMs 150, i.e., opposing wheels. In other examples such as those illustrated in FIGS. 14C and 14D, the vehicle 100 can include just a single pair of opposing VCMs 150 while other wheels of the vehicle 100, if any, are implemented in other manners, e.g., using conventional arrangements for steering, drive, braking and/or suspensions systems.

Figure 15:
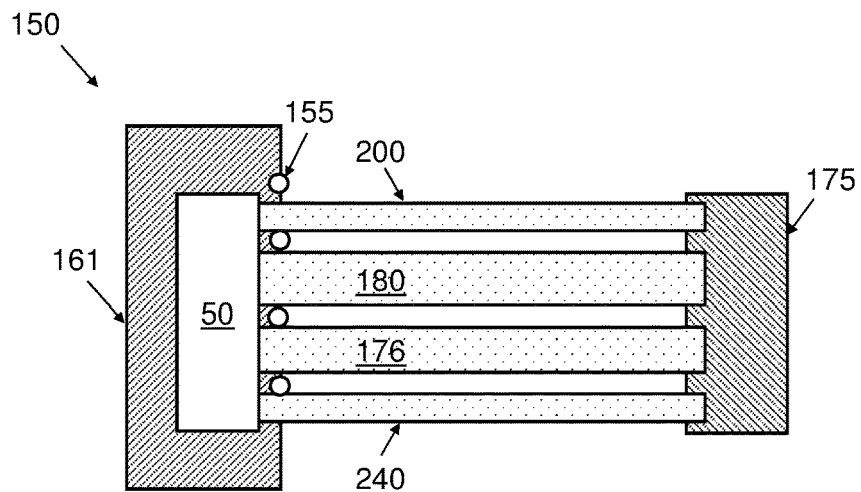
FIGS. 15, 16A and 16B are schematic illustrations of a VCM comprising a plurality of sub-systems, according to embodiments of the present invention.

We now refer to FIG. 15. A VCM 150 according to embodiments includes a plurality of sub-systems each comprising mechanical and/or electrical components. Each of the sub-systems is in contact with, or connected to, the sub-frame 161 and with a wheel interface 175. The plurality of sub-systems of each VCM 150 are selected from amongst the following four sub-systems:

a. Steering sub-system 200, which can include any or all of the mechanical and/or electrical components required for steering, i.e., pivoting the wheel of the vehicle around a steering axis, including, and not exhaustively: a steering motor, a steering actuator, steering rods, steering system controller or control unit, steering inverter and wheel-angle sensor. Some components of the steering sub-system are illustrated in FIGS. 3B and 4A. In embodiments, the VCM-controller 50 of the VCM 150 receives steering instructions as electrical (including electronic) inputs from the vehicle, e.g., from a driver-operated steering mechanism or an autonomous steering unit, and carries out said instructions by causing, responsively to said instructions, the motion of a steering rod, e.g., via a steering actuator, to effect the turning of the wheel, for example, by regulating a current and voltage transmitted to the steering actuator and/or transmitting high-level instructions to a steering-system controller. The steering motor, actuator and/or inverter can receive electrical power from an external power source ('external' meaning external to the VCM), such as a battery pack installed in the chassis of the vehicle, or from a power source associated with a testing set-up, e.g., the testing apparatus of FIG. 21. The steering system controller, where applicable can receive power either from a power source 59 (shown in FIG. 17A) of the VCM-controller 50 or from the abovementioned external power source.

b. Drive system 180, which can include any or all of the mechanical and/or electrical components required for actuating a drive shaft to rotate the wheel of the vehicle to drive the vehicle, including, and not exhaustively: an electric drive motor, a driveshaft turned by the motor, and gearing assemblies to transmit the rotation to the wheel including, optionally, a single-hear or multi-gear transmission, as well as sensors such as a wheel speed sensor (in a non-limiting example, a rotary encoder). Some components of the drive system are illustrated in FIGS. 3A, 3E, 3F, 4A and 4B. In some embodiments, the drive motor is included in the VCM, and in some embodiments, the drive motor is on the vehicle, e.g., installed on the chassis. In embodiments, the VCM controller 50 of the VCM 150 is configured to regulate an output of the motor and/or a rotational velocity of the wheel and/or a selection of a transmission gear, in response to instructions received via electrical inputs from the vehicle, e.g., from a driver-operated drive mechanism (e.g. an accelerator pedal) or an autonomous driving unit. In embodiments, the instructions include, for example, a current and a voltage for actuating the electric drive motor. In embodiments, the drive sub-system 180 can be used in a regenerative braking scheme in which the drive motor acts as a generator of electricity when the vehicle slows. Storage of the recuperated electricity can be in a vehicle-onboard energy storage device. In an example, a driver removes a foot from the accelerator pedal (or an autonomous drive system stops powering the drive wheels), and from that point the regenerative braking scheme begins to recuperate electrical energy generated by the slowing of the vehicle, i.e., as the turning of the generator translated via the drivetrain to a mechanical resistance force. In another example, the regenerative braking is boosted by friction braking, i.e., regular operation of the braking system 176, in response to the driver depressing the brake pedal (or receiving a brake-actuation instruction from an autonomous drive computer). In such an example, part of the energy used to brake the vehicle is lost to heat in the 'regular' friction braking arrangement, and at least a part of the energy is recaptured as stored electrical energy. In embodiments, 'cooperation' of the drive system 180 and the braking sub-system 176 in combining regenerative braking with friction braking can be controlled by the VCM-controller 50. In yet another example, in which the VCM-controller is configured (e.g., programmed) to control multiple sub-systems in cooperation with each other, the steering sub-system 200 can be used to assist in braking, i.e., in cooperation with the braking system, for example by turning the wheels so as to increase friction with a roadway, whether by steering symmetrically by having the opposing wheels turn in the same direction in tandem, or asymmetrically where the opposing wheels do not turn in tandem. In a similar example, the VCM-controller controls the steering sub-system 200 in concert with the braking system to mitigate the effect of brake pull caused by steering, a phenomenon also known as 'brake steer' or 'steering drift'. In yet another example, the VCM-controller controls, in concert, the drive system (with respect to regenerative braking), the braking system (with respect to friction braking) and the steering system (with respect to 'braking-by-steering') to achieve a desired braking effect.

c. Braking system 176, which can include any or all of the mechanical and electrical components for actuating a brake assembly (e.g., brake disk, brake caliper, etc.) including, optionally, one or more of a VCM-onboard hydraulic system, a VCM-onboard vacuum-boost system, or a hybrid brake-assist system incorporating a pressurized-gas accumulator and brake actuator. Some components of the braking system are illustrated in FIGS. 3C, 3G and 4C. In embodiments, the VCM controller 50 of the VCM 150 is configured to regulate an output of the braking system, e.g., cause a braking action, in response to instructions received via electrical inputs from the vehicle, e.g., from a driver-operated braking mechanism (e.g. a brake pedal) or an autonomous braking unit.

d. Suspension system 240, which can optionally include an active suspension system controllable by the VCM-controller 50 (e.g., via a suspension-system control unit) of the VCM 150. Some components of an active suspensions system, including a spring damper, a movement sensor and a control unit, are illustrated in FIG. 4B.

Figure 16A:
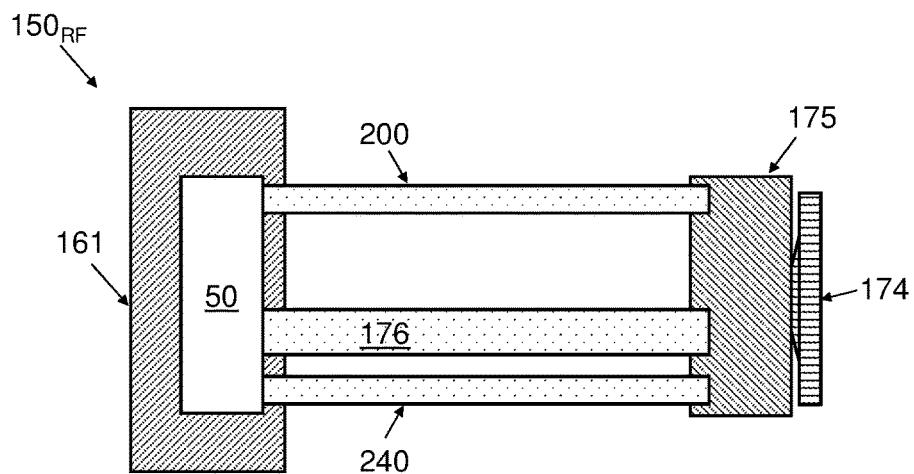
Figure 16B:
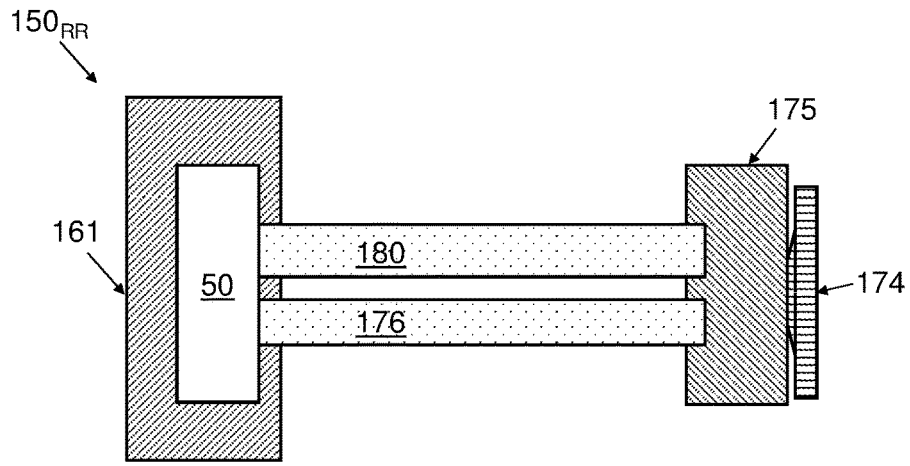

In some embodiments, the plurality of VCM sub-systems in any given VCM 150 includes all of the four sub-systems of paragraphs a.-d. In other embodiments, the plurality of VCM sub-systems in a given VCM 150 or in each VCM 150 of a given pair of opposing VCMs 150 can include a selected two sub-systems or a selected three sub-systems. In FIG. 16A for example, an illustrative VCM $150_{RF}$ for installation as a right-front VCM 150 in a vehicle, includes a steering sub-system 200, a braking sub-system 176, and an active suspension system 240. In FIG. 16B for example, an illustrative VCM $150_{RR}$ for installation as a right-rear VCM 150 in a vehicle, includes a drive sub-system 180 and a braking sub-system 176. In both examples, the included subsystems can be arranged such that they are entirely included in/on the VCM, in that all of the mechanical and electrical components necessary for respective functions can be onboard the VCM 150, with electrical transmission and communications arrangements passing from the vehicle to the VCM-controller and/or to the respective sub-systems (e.g., to their controllers, motors and/or actuators). The passing of electrical transmission and communications arrangements can be via the sub-frame 161 which is mounted to the 'host' vehicle.

Figure 17A:
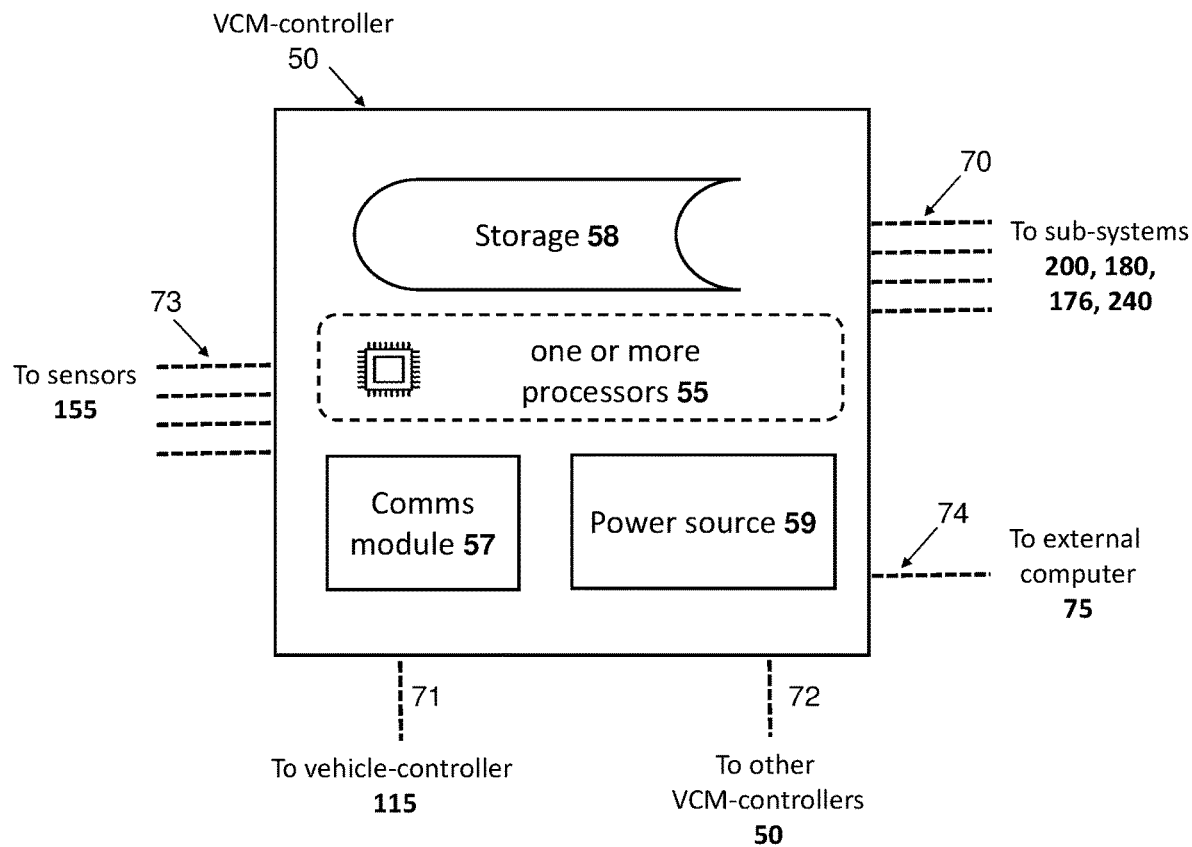
FIGS. 17A, 17B and 17C are schematic diagrams of a VCM-controller, according to embodiments of the present invention.

Referring now to FIG. 17A, a VCM-controller 50 according to embodiments is illustrated schematically to show selected components. The exemplary VCM-controller 50 of FIG. 17A includes one or more computer processors 55, a computer-readable storage medium 58, a communications module 57, and a power source 59. The computer-readable storage medium 58 can include transient and/or transient storage, and can include one or more storage units, all in accordance with desired functionality and design choices. In embodiments, the storage 58 can be used for any one or more of: storing program instructions, in firmware and/or software, for execution by the one or more processors 55 of the VCM-controller 50; and historical operating data and/or maintenance data and/or ownership data relating to the VCM and/or any one or more of its sub-systems and their components. The communications module 59 is configured to establish communications links with a vehicle-onboard vehicle controller 115 via communications arrangements 71, to other VCM controllers 50 e.g., VCM controllers 50 of VCMs 150 of the same vehicle 100, via communications arrangements 72, to an external computer 75 via communications arrangements 74 to VCM subsystems 200, 180, 176, 240, including to respective sub-system control units via communications arrangements 70, and to sensors 155 e.g., sensors 155 located in/on the VCM 150, via communications arrangements 73. In embodiments, not every VCM-controller 50 includes all of the components shown in FIG. 17A.

Figure 21:
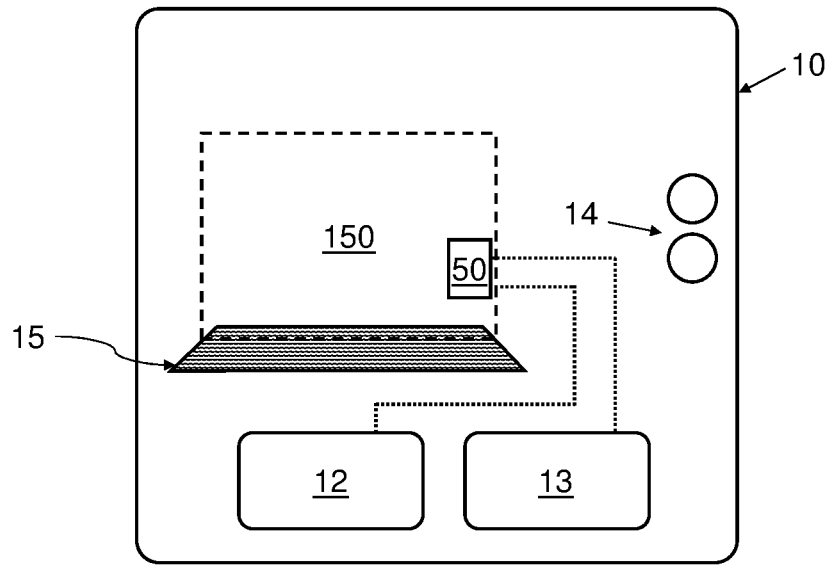
FIG. 21 is a schematic diagram of a VCM-testing apparatus according to embodiments of the present invention.

The external computer 75 can be, for example, the testing computer 13 shown in FIG. 21, or an external computer hosting a permission system or other financial/administrative system. A 'permission system' in an external computer 75 can be provided, for example, and not exhaustively: to approve a replacement of a VCM by another VCM; to initiate or perform a financial operation related to a servicing or replacement of a VCM, such as recording a charge or processing a payment; to record operating data and maintenance data, including operating history and maintenance history, of a VCM; and/or to give permission for a servicing or replacement of a VCM based on a financial operation and/or a subscription-type service or lease arrangement which includes servicing and/or replacement of a VCM either as part of the service or arrangement or at an additional charge, e.g., according to a set tariff or a discount related to the service or arrangement.

Figure 17B:
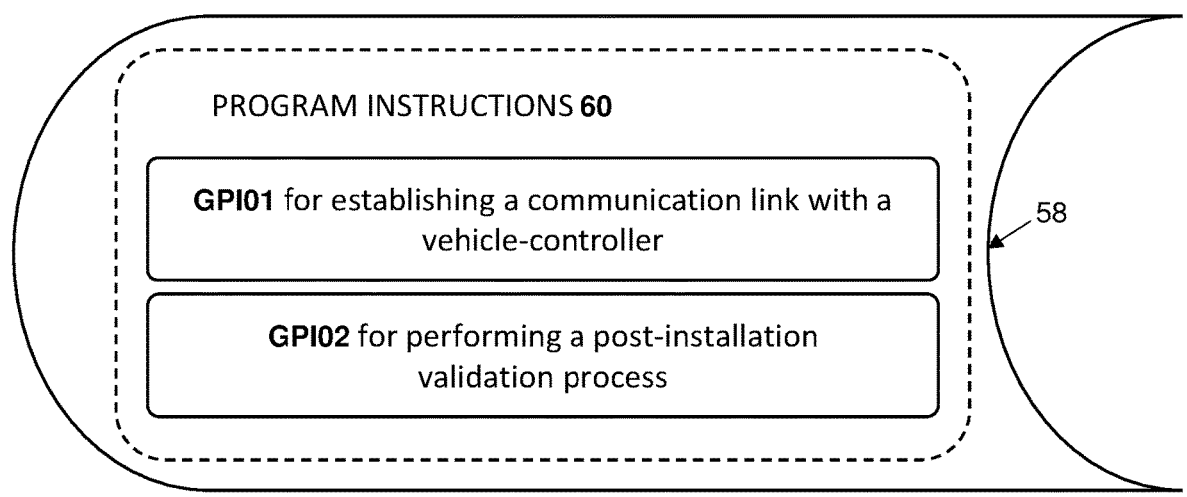

The storage medium 58 of the exemplary VCM controller 50 is shown in FIG. 17B to include program instructions 60 related to installing a VCM 150 on a vehicle 100, for example at a service station, e.g., the service station 110 of FIG. 1D or the service station of FIG. 12C, at which service station a VCM can be replaced by another. In the illustrated example of FIG. 17B, the program instructions 60 include two groups of program instructions GPI01, GPI02 for execution by the one or more processors 55 of the VCM-controller 50:

Program Instructions GPI01 for establishing (by the VCM-controller 50) a communications link with the vehicle-controller 115. The establishing includes electronically transferring information about the VCM 150 from the VCM-controller to the vehicle-controller. In some embodiments, the communication link with the vehicle-controller 115 is a two-way link, and the establishing of the communication link additionally includes receiving information about the vehicle 100, and/or about another VCM 150 installed on the vehicle 100. The information about the vehicle 100, and/or about the other VCM 150 installed on the vehicle 100 can include, for example, operating and maintenance data and/or history of the vehicle 100, and/or of the other VCM 150. In some embodiments, the information about the VCM 150 transferred from the VCM-controller 50 to the vehicle-controller 115 includes information about at least one of the plurality of subsystems, and/or includes results of a self-diagnostic test carried out before the installation. The plurality of subsystems can include two, three, or four sub-subsystems selected from VCM subsystems 200, 180, 176, 240. In some embodiments, the establishing of the communication link with the vehicle-controller 115 is before the installation of the replacement VCM on the vehicle 100—in other words, the communication link is established while the replacement VCM (or, in some embodiments, the potential replacement VCM) is not connected to or mounted on the vehicle. Such a communication link with a vehicle-controller may be established, for example, while the replacement VCM is still in a storage area of a service station, or, alternatively, already selected for use with the vehicle and removed from the storage area. In some embodiments, a failure to establish a communications link can be a reason to disqualify a given VCM for installation on the vehicle, or at least delay the installation until the reason for failing to establish the communications link can be ascertained. Similarly, a communications link may be successfully established but information transferred from the VCM-controller to the vehicle-controller (or vice versa) may cancel or delay installation of the given VCM on the vehicle. In an example, the VCM-controller transfers information about a component specification, operating history or maintenance history that causes the vehicle-controller to determine that the given VCM should not be installed. In embodiments, the pre-installation exchange of information can include checking compatibility of the VCM with other VCMs already installed on the vehicle-for example, checking whether they have the same type and version of a given sub-system, or of any given item of hardware or software on the replacement VCM. In another example, a number of different replacement VCMs can establish respective communications links with the vehicle-controller so that the vehicle-controller can 'select' the most compatible VCM in storage at a service-station location, or alternatively, can 'go shopping' for a VCM with the most favorable financial conditions attached to its potential installation (including, for example, determining whether a given VCM is enrolled in a subscription service or leasing arrangement, or perhaps set aside for premium customers which will pay the owner or provider of the VCM more money).

Program Instructions GPI02 for performing, in response to an installation of the VCM 150 on a vehicle, a post-installation validation-process that includes validating the plurality of subsystems (which are selected from VCM subsystems 200, 180, 176, 240) and communicating a result of the validating to the vehicle-controller 115. In some embodiments, validating the plurality of subsystems includes receiving information from one or more sensors 155 onboard the VCM 150. In some embodiments, post-installation operation of the vehicle 100 is contingent upon receiving a positive validation-process result, and failure to complete the validation process can mean that the vehicle is disabled from driving until the failure is resolved.

Figure 17C:
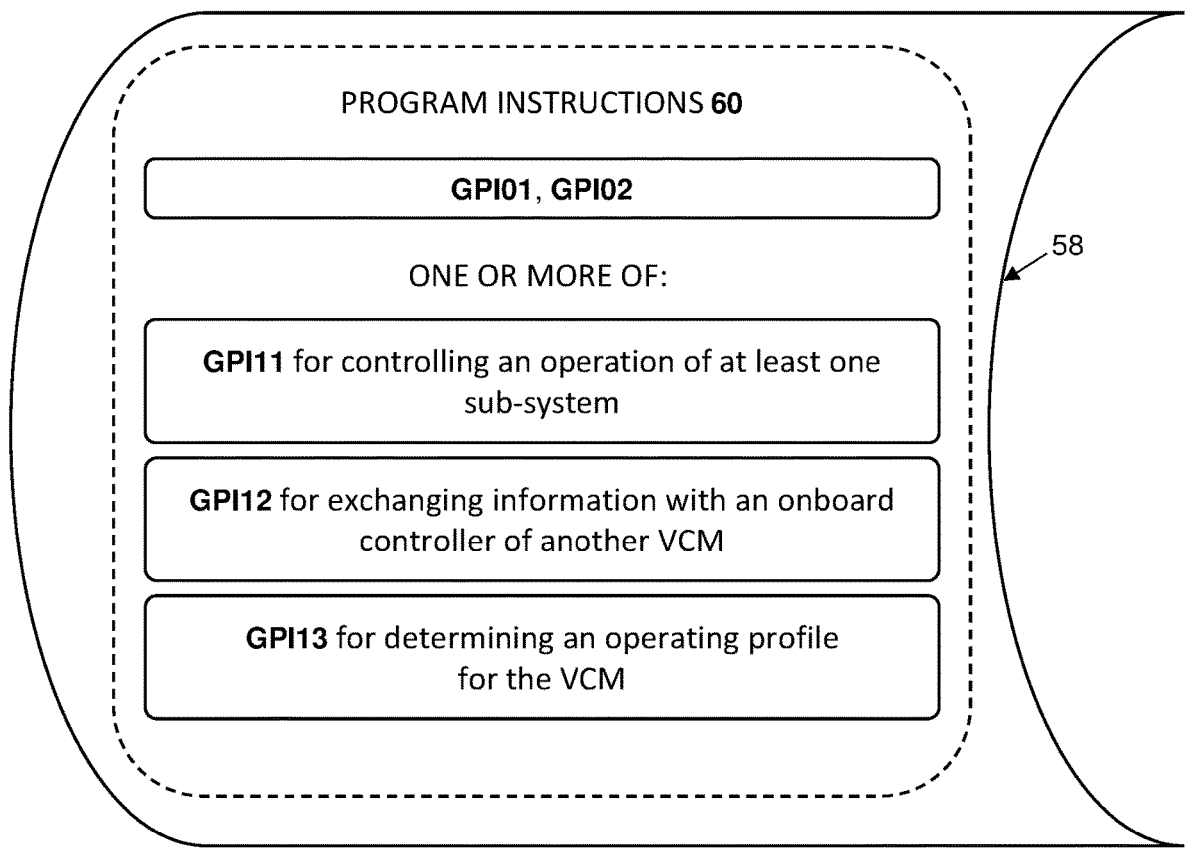

In various embodiments, as illustrated in FIG. 17C, the program instructions 60 stored in storage medium 58 of the exemplary VCM controller 50 can additionally include any one or more, or all, of additional groups of program instructions GPI11, GPI12, GPI13 for execution by the one or more processors 55 of the VCM-controller 50:

Program Instructions GPI11 for regulating, i.e., controlling actuation of at least one sub-system of the plurality of sub-systems, in response to incoming electrical signals received from outside the VCM.

Program Instructions GPI12 for exchanging information (by the VCM-controller 50) with a VCM-onboard VCM-controller 50 of another VCM 150 installed on the vehicle 100.

Program Instructions GPI13 for determining an operating profile for the VCM 150 based on data received from the vehicle-controller 115. An operating profile can include profiles, i.e., physical, mechanical, electrical and/or operating data of any one or more of the VCM sub-systems 200, 180, 176, 240 of the second VCM. In non-limiting examples, the operating profile can include: a braking profile based on the design and/or operating history of the braking sub-system 176 of the second VCM 150; a dynamic-response profile of a motor and transmission based on the design and/or operating history of the drive sub-system 180 of the second VCM 150; a steering profile based on the design and/or operating history of the steering sub-system 176 of the second VCM 150; and a suspension-dampening profile based on the design and/or operating history of the suspension sub-system 240 of the second VCM 150.

Figure 18:
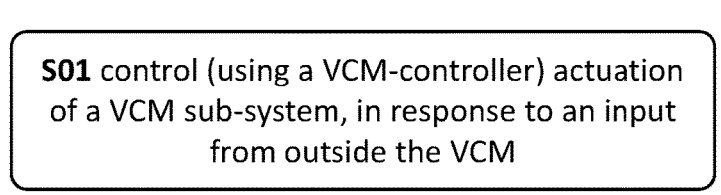
FIG. 18 is a flowchart of a method for operating a vehicle, according to embodiments of the present invention.

Referring now to FIG. 18, a method is disclosed for operating a vehicle 100, e.g., any of the vehicles 100 illustrated and described hereinabove and incorporating a communications bus (e.g., communications bus 153 of FIG. 14A or communications bus 154 of FIG. 14B), and at least one pair of opposing VCMs 150 having respective VCM-controllers 50 according to any one or more of the embodiments disclosed herein. As illustrated by the flow chart in FIG. 18, the method comprises:

Step S01 controlling, by a VCM-controller 150, actuation of one or more sub-systems of the plurality of VCM subsystems of a VCM (which are selected from VCM subsystems 200, 180, 176, 240), in response to an incoming electrical input from outside the VCM 150.

Figure 19A:
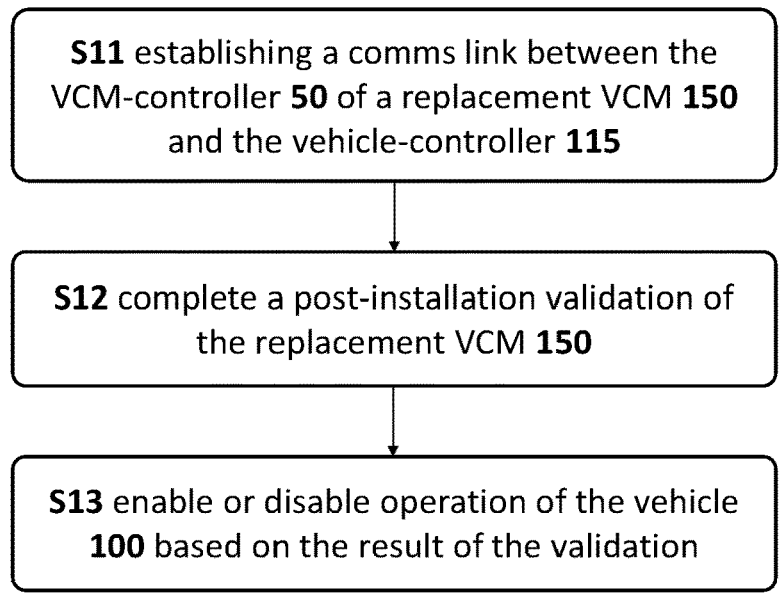
FIGS. 19A, 19B, 19C and 20 are flowcharts showing steps of methods for replacing a VCM on a vehicle, according to embodiments of the present invention.

Referring now to FIG. 19A, a method is disclosed for replacing a first vehicle corner module (VCM) with a second VCM. The skilled artisan will understand that a method for replacing a VCM with a second VCM is applicable, mutatis mutandis, to re-installing a VCM dismounted from a vehicle, e.g., for servicing. Thus, the concept of "replacing by a second VCM" both in the present disclosure and in the claims appended thereto, should be understood to include examples in which the first VCM and the second VCM are the same VCM, and such examples are wholly within the scope of the invention.

According to the method illustrated in FIG. 19A, at least the second VCM (and optionally the first/replaced VCM) is a VCM 150 according to any one or more of the embodiments disclosed herein and comprises a sub-frame 161 mountable to the reference frame of the vehicle 100, a wheel-hub assembly 174 (illustrated in FIGS. 16A-16B), a VCM-onboard VCM-controller, and a plurality of subsystems mediating between the sub-frame 161 and the wheel-hub assembly 174 and selected from VCM subsystems 200, 180, 176, 240. As illustrated by the flow chart in FIG. 19A, the method comprises:

Step S11 establishing an electronic communication link between the respective VCM-controller 50 of the second VCM 150 and a vehicle-onboard vehicle-controller 115—including transferring information about the second VCM 150 from the respective VCM-controller 50 (of the second VCM 150) to the vehicle-controller 115. In some embodiments, the electronic communication link with the vehicle-controller 115 is a two-way link, and the establishing of the electronic communication link additionally includes receiving information about the vehicle 100, and/or about another VCM 150 installed on the vehicle. In some embodiments, the vehicle-controller 115 can send a query to the VCM-controller 50 of the second VCM 150, and at least a portion of the information about the second VCM 150 transferred from the respective VCM-controller 50 to the vehicle-controller 115 may include a response to the query received from the vehicle controller 115. In some embodiments, the information about the second VCM 150 includes results of a self-diagnostic test carried out, e.g., by the second VCM 150 itself, or by a testing apparatus such as the testing apparatus 10 of FIG. 21, before the installation. In some embodiments, the information about the second VCM 150 includes at least one of operating history and maintenance history of the second VCM 150. In some embodiments, the electronic communication link between the respective VCM-controller 50 of the second VCM 150 and the vehicle-onboard vehicle-controller 115 is established before the installation of the second VCM 150— in other words, the communication link is established while the replacement VCM (or, in some embodiments, the potential replacement VCM) is not connected to or mounted on the vehicle. Such a communication link with a vehicle-controller may be established, for example, while the replacement VCM is still in a storage area of a service station, or, alternatively, already selected for use with the vehicle and removed from the storage area. In some embodiments, a failure to establish a communications link can be a reason to disqualify a given VCM for installation on the vehicle, or at least delay the installation until the reason for failing to establish the communications link can be ascertained. Similarly, a communications link may be successfully established but information transferred from the VCM-controller to the vehicle-controller (or vice versa) may cancel or delay installation of the given VCM on the vehicle. In an example, the VCM-controller transfers information about a component specification, operating history or maintenance history that causes the vehicle-controller to determine that the given VCM should not be installed. In embodiments, the pre-installation exchange of information can include checking compatibility of the VCM with other VCMs already installed on the vehicle-for example, checking whether they have the same type and version of a given sub-system, or of any given item of hardware or software on the replacement VCM. In another example, a number of different replacement VCMs can establish respective communications links with the vehicle-controller so that the vehicle-controller can 'select' the most compatible VCM in storage at a service-station location, or alternatively, can 'go shopping' for a VCM with the most favorable financial conditions attached to its potential installation (including, for example, determining whether a given VCM is enrolled in a subscription service or leasing arrangement, or perhaps set aside for premium customers which will pay the owner or provider of the VCM more money).

Step S12 completing, in response to and contingent upon an installation of the second VCM 150 on the vehicle 100, a post-installation validation—including validating the respective plurality of subsystems of the second VCM 150 and communicating a result of the validation to the vehicle-controller 115.

Step S13 using the result of the validation, communicated to the vehicle controller in Step S12, to enable or disable operation of the vehicle after the installation of the second using the communicated result of the validation to enable or disable operation of the vehicle 100 after installation of the second VCM 150. In some embodiments, the validating of the plurality of subsystems includes receiving information from one or more sensors 155 onboard the second VCM 150, such as, without limitation and not exhaustively, a suspension-travel sensor, a wheel-angle sensor, a wheel-speed sensor, or a sensor of a hydraulic braking system such as a pressure sensor or a level sensor.

Figure 19B:
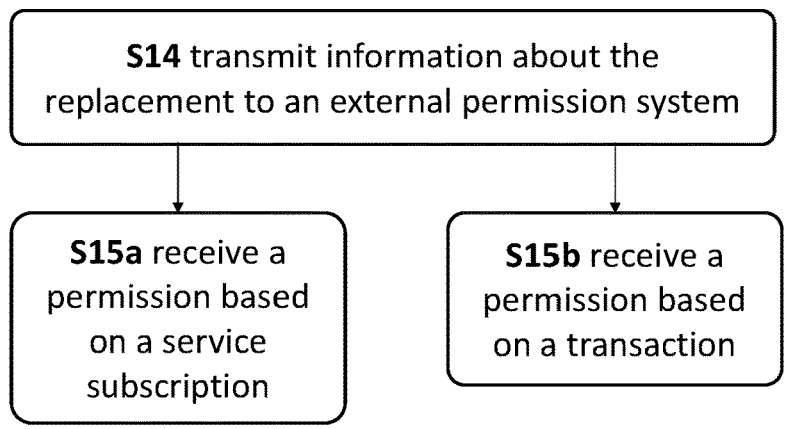

In some embodiments, the method includes an additional step S14, as illustrated in the flowchart of FIG. 19B:

Step S14: transmitting, to a permission system in an external computer, information about the replacing of the first VCM with the second VCM. In embodiments, the information transmitted to the permission system includes at least two of: respective identifying information of the first and second VCMs; usage information of one or more of the respective plurality of subsystems of the first VCM; and maintenance information of one or more of the respective plurality of subsystems of the first VCM. In some embodiments, a value is assigned to the replacing or, equivalently, a servicing) based on at least one of: usage information of one or more of the respective plurality of subsystems of the first VCM; usage information of one or more of the respective plurality of subsystems of the second VCM; maintenance information of one or more of the respective plurality of subsystems of the first VCM; and maintenance information of one or more of the respective plurality of subsystems of the second VCM As further illustrated in the flowchart of FIG. 19B, in some embodiments in which the method includes Step S14, the method additionally includes either Step S15*a* or S15*b:*

Step S15*a*: receiving, from the permission model, a permission based on a service subscription such as, in non-limiting examples, a leasing arrangement or an annual service contract.

Step S15*a*: receiving, from the permission model, a permission based on a transaction such as, in non-limiting examples, a payment or a credit check.

In some embodiments, both Steps S15*a* and S15*b* are included in the method; in an illustrative example, a leasing arrangement provides for servicing and/or replacing of the VCM at a predetermined tariff price or at a discounted price, e.g., based on a percentage discount.

Figure 19C:
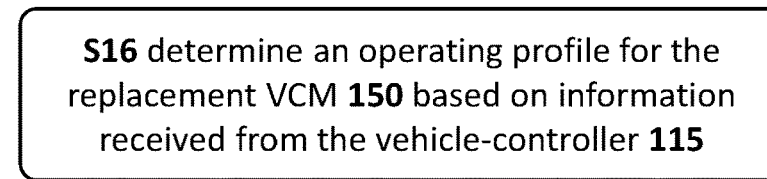

In some embodiments, the method includes an additional step S16, as illustrated in the flowchart of FIG. 19C:

Step S16: determining an operating profile for the second VCM based on information received from the vehicle-controller. An operating profile can include profiles, i.e., physical, mechanical, electrical and/or operating data of any one or more of the VCM sub-systems 200, 180, 176, 240 of the second VCM. In non-limiting examples, the operating profile can include: a braking profile based on the design and/or operating history of the braking sub-system 176 of the second VCM 150; a dynamic-response profile of a motor and transmission based on the design and/or operating history of the drive sub-system 180 of the second VCM 150; a steering profile based on the design and/or operating history of the steering sub-system 176 of the second VCM 150; and a suspension-dampening profile based on the design and/or operating history of the suspension sub-system 240 of the second VCM 150.

Figure 20:
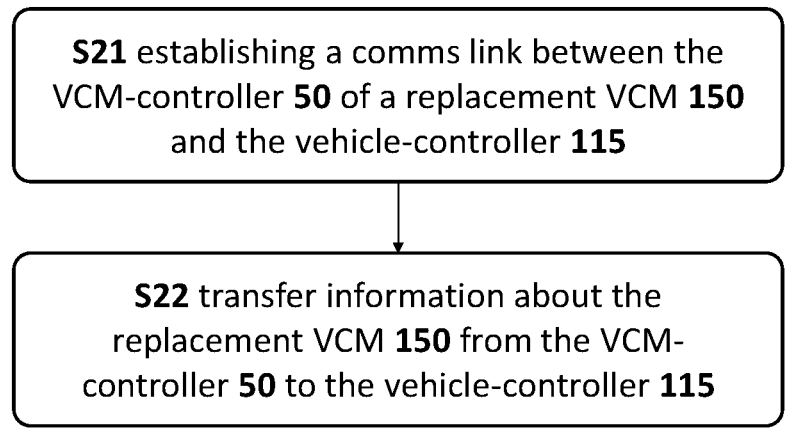

Referring now to FIG. 20, a second method is disclosed for replacing a first vehicle corner module (VCM) with a second VCM (or, equivalently, re-installing a VCM dismounted from a vehicle, e.g., for servicing). According to the method illustrated in FIG. 20, at least the second VCM (and optionally the first/replaced VCM) is a VCM 150 according to any one or more of the embodiments disclosed herein and comprises a sub-frame 161 mountable to the reference frame of the vehicle 100, a wheel-hub assembly 174 (illustrated in FIGS. 16A-16B), a VCM-onboard VCM-controller, and a plurality of subsystems mediating between the sub-frame 161 and the wheel-hub assembly 174 and selected from VCM subsystems 200, 180, 176, 240. As illustrated by the flow chart in FIG. 20, the method comprises:

Step S21: establishing an electronic communication link between the respective VCM-controller 50 of the second VCM 150 and a vehicle-controller 115 onboard the host vehicle 100. In some embodiments, the communication link is established before the replacement/serviced VCM 150 is mounted to the host vehicle 100.

Step S22: transferring information about the second VCM 150 from the respective VCM-controller 50 of the second VCM 150 to the vehicle-controller 115. In some embodiments, the transferred information includes results of validating the plurality of sub-systems by the VCM-controller 50. In some embodiments, operation of the host vehicle 100 after the replacement/serviced VCM 150 is mounted thereto is contingent upon receiving a positive validation-process result from the VCM-controller 50.

We now refer to FIG. 21, a schematic illustration of a testing apparatus 10 which includes a support element 15 for a dismounted VCM 150. A support element 15 can be designed to support some or all of the weight of the VCM, or some or all of the weight of the sub-frame 161, or any or all of the VCM subsystems 200, 180, 176, 240 or components thereof. In some embodiments, there can be multiple support elements 15, e.g., to support different components or sub-systems. In some examples, the testing apparatus 10 can include a fixed installation at which a dismounted (or, in some cases, mounted) VCM 150 can be tested, and in other examples, the testing apparatus 10 can include a storage container for storing and/or transporting a VCM 150. The testing apparatus can include testing sensors 14, a diagnostic device 12, and a testing computer 13. An example of a diagnostic device 12 in a fixed-installation testing apparatus is a chassis dynamometer. In an embodiment, a VCM-controller 50 transmits results of a self-diagnostic test performed using a testing apparatus 10 to a vehicle controller 115 before or during installation of a VCM 150 on the vehicle 100. In another example, such a test can be performed without a testing apparatus 10, for example while the VCM is being stored in a facility or container that is not equipped with some or all of said components of the testing apparatus 10. In another example, the VCM-controller 50 transmits results of a self-diagnostic test performed using a testing apparatus 10 after receiving the results from the testing apparatus 10. In some embodiments, the vehicle-controller 115 can receive results of a self-diagnostic test for the VCM 150 directly from the test assembly 10 where the test was performed.

Additional Discussion of Inventive Concepts

Inventive Concept 1: A vehicle corner module (VCM) system, comprising: a sub-frame of interfacing between the VCM and a vehicle platform; a wheel interface for coupling a wheel to the VCM; one or more of VCM modules, which include mechanical assemblies and electrical units for operating a wheel when assembled on the vehicle; and one or more electrical interfaces for exchanging signals and data between the VCM modules and the vehicle platform.

Inventive Concept 2: A vehicle corner module (VCM) system according to Inventive Concept 1, comprising: one or more sensors for measuring operational data of the one or more VCM modules; a VCM controller in electrical connection with the one or more electrical interfaces and the one or more electrical units of the VCM modules.

Inventive Concept 3: A vehicle corner module (VCM) system according to either one of Inventive Concepts 1 or 2, wherein the VCM modules comprise one or more of: a suspension module, a wheel driving module, a steering module, and a control module, and the wheel driving module comprises one or more of: an electric motor unit, a transmission unit, and a braking unit.

Inventive Concept 4: A VCM system according to any one of Inventive Concepts 1 to 3, wherein one or more VCM modules are located between the wheel interface and the sub-frame.

Inventive Concept 5: A VCM system, according to any one of Inventive Concepts 1 to 4, wherein: the one or more electrical units comprise a VCM module controller; and the VCM module controller comprises integrated circuits having hardware and software that control two or more VCM modules.

Inventive Concept 6: A vehicle having one or more of the VCMs of Inventive Concepts 1 to 5.

Inventive Concept 7: A vehicle according to Inventive Concept 6, comprising a VCM control unit (CSCU); and a platform-VCM bus for communication between the vehicle and one or more of electrical circuits located in the VCMs.

Inventive Concept 8: A vehicle according to Inventive Concept 7, wherein the VCMs are in direct electrical communication, such that data can be exchanged between the VCMs bypassing the CSCU.

Inventive Concept 9: A method of activating a VCM, comprising: mounting the VCM on a vehicle platform; setting a VCM operational profile; and activating the VCM to be operational with the VCM operational profile.

Inventive Concept 10: A method according to Inventive Concept 9, comprising: matching between operational profiles of the VCM and the vehicle platform; and the setting of a VCM operational profile is to a matching operational profile of the VCM.

Inventive Concept 11: A method according to either one of Inventive Concept 9 or 10, comprising: matching between operational profiles of the VCM and the operational profiles of other VCMs coupled to the vehicle platform; and setting the operational profile of one or more of the VCMs coupled to the vehicle platform in accordance to the matching between operational profiles of the one or more of the VCMs.

Inventive Concept 12: A method according to any one of Inventive Concept 9 to 11, comprising: receiving an operational plan defined for the VCM; and setting a VCM operational profile according to the operational plan.

Inventive Concept 13. A method according to any one of Inventive Concept 9 to 12, comprising: recording operational data of the VCM; and outputting operational data to a computing system external to the VCM.

Inventive Concept 14. A method of servicing a vehicle having one or more vehicle corner modules (VCMs), comprising: receiving an indication that servicing of a system located in the VCM is required; halting the operation of the vehicle; de-coupling the VCM from the vehicle; mounting a substituting VCM to the vehicle; and resuming the operation of the vehicle.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a marking" or "at least one marking" may include a plurality of markings.

The invention claimed is:

1. A vehicle corner module (VCM) for regulating motion of a host vehicle, the vehicle comprising a vehicle-onboard vehicle-controller, the VCM comprising:
   a. a sub-frame mountable to a reference frame of the host vehicle;
   b. a wheel-hub assembly comprising a wheel-hub;
   c. a plurality of sub-systems mediating between the sub-frame and the wheel-hub assembly, the plurality of subsystems selected from the group of subsystems consisting of a drive subsystem, a steering subsystem, a suspension subsystem and a braking subsystem; and
   d. an VCM-onboard VCM-controller, comprising one or more processors and a computer-readable medium storing program instructions that, when executed by the one or more processors, cause the one or more processors to establish a communication link with the vehicle-controller, wherein the establishing includes electronically transferring information about the VCM from the VCM-controller to the vehicle-controller, and
   wherein the information about the VCM includes results of a self-diagnostic test carried out before the installation.

2. Apparatus for testing of a VCM according to claim 1 when the VCM is mechanically decoupled from any vehicle, the apparatus comprising:
   a. a support element for at least partly supporting the weight of the sub-frame and for constraining movement of the sub-frame;
   b. at least one diagnostic device for measuring operational data of at least one of the plurality of subsystems, and
   c. a computing device configured to communicate with the VCM-controller and receive therefrom diagnostic information related to the offline testing, wherein the testing includes a functional test of at least one of the plurality of subsystems.

3. The VCM of claim 1, wherein the self-diagnostic test was performed using a testing apparatus.

4. An apparatus for testing of a vehicle control module (VCM) when the VCM is mechanically decoupled from any vehicle, the VCM comprising a sub-frame mountable to a reference frame of a vehicle, a wheel-hub assembly, a VCM-onboard VCM-controller, and plurality of subsystems residing onboard the VCM to mediate between the sub-frame and the wheel-hub assembly, the subsystems selected from the group of subsystems consisting of a drive subsystem, a steering subsystem, a suspension subsystem and a braking subsystem, the apparatus comprising:
   a. a support element for at least partly supporting the weight of the sub-frame and for constraining movement of the sub-frame;
   b. at least one diagnostic device for measuring operational data of at least one of the plurality of subsystems, and
   c. a computing device configured to communicate with the VCM- controller and receive therefrom diagnostic information related to the offline testing,
   wherein the testing includes a functional test of at least one of the plurality of subsystems.

5. The apparatus of claim 4, wherein the computing device is additionally configured (i) to receive diagnostic information related to the testing from the at least one diagnostic device and (ii) combine diagnostic information received from the at least one diagnostic device with diagnostic information received from the VCM-controller.

6. The apparatus of claim 4, wherein at least one parameter of the testing is selected by the VCM-controller.

7. The apparatus of claim 4, wherein the at least one diagnostic device includes a chassis dynamometer.

8. The apparatus of claim 4, wherein the apparatus is configured to emulate a full connection of a VCM to an operative vehicle, the emulation including injection of test signals to the tested VCM.

9. The apparatus of claim 4, wherein the functional test of at least one of the plurality of subsystems includes a test of two or more of the subsystems in an operational scenario involving combined operations of the subsystems.

10. A vehicle corner module (VCM) for regulating motion of a host vehicle, the VCM comprising:
   a. a sub-frame mountable to a reference frame of the host vehicle;
   b. a wheel-hub assembly comprising a wheel-hub;
   c. a plurality of sub-systems mediating between the sub-frame and the wheel-hub assembly, the plurality of subsystems selected from the group of subsystems consisting of a drive subsystem, a steering subsystem, a suspension subsystem and a braking subsystem; and
   d. an VCM-onboard VCM-controller, comprising one or more processors and a computer-readable medium storing program instructions that, when executed by the one or more processors, cause the one or more processors to perform, in response to an installation of the VCM on a vehicle, a post-mounting calibration process that includes updating one or more VCM parameters in accordance with one or more updated parameters of the vehicle.

11. The VCM of claim 10, wherein the one or more updated VCM parameters includes a wheel orientation parameter selected from camber, caster, and toe angle.

12. The VCM of claim 10, wherein the one or more updated VCM parameters includes a braking subsystem parameter.

13. A storage unit for a vehicle corner module (VCM), the VCM comprising a mountable sub-frame mountable, a wheel-hub assembly, a VCM-controller, and plurality of subsystems residing onboard the VCM to mediate between the sub-frame and the wheel-hub assembly, the subsystems selected from the group of subsystems consisting of a drive subsystem, a steering subsystem, a suspension subsystem and a braking subsystem, the storage unit comprising:
   a. one or more mechanical mounts adapted to support the weight of the VCM within the storage unit;
   b. a storage-unit controller programmed to perform health tests on a VCM stored within the storage unit;
   c. one or more sensors, each one selected from: a vibration sensor, a mechanical load sensor, and a mechanical moment sensor; and
   d. a local interface device configured to provide VCM test results and/or enable control of test parameters.

14. The storage unit of claim 13, comprising a plurality of walls.

15. The storage unit of claim 13, wherein the one or more sensors are installed in the one or more mechanical mounts.

16. The storage unit of claim 13, wherein the health tests are performed by activating one or more subsystems of the VCM.

17. The storage unit of claim 13, wherein the storage unit comprises a mobile storage unit.

18. The storage unit of claim 13, wherein the one or more mechanical mounts are configurable to fit VCMs of different types.

19. The storage unit of claim 13, sized and shaped to have multiple VCMs stored therewithin simultaneously.

* * * * *